United States Patent
Liu et al.

(10) Patent No.: US 12,279,204 B2
(45) Date of Patent: Apr. 15, 2025

(54) LOW-POWER SYNCHRONIZATION SIGNALS AND WAKE UP SIGNALS

(71) Applicant: QUALCOMM Incorporated, San Diego, CA (US)

(72) Inventors: Le Liu, San Jose, CA (US); Huilin Xu, Temecula, CA (US); Hung Dinh Ly, San Diego, CA (US); Yuchul Kim, San Diego, CA (US); Linhai He, San Diego, CA (US); Prashant Sharma, San Jose, CA (US); Ahmed Elshafie, San Diego, CA (US); Changhwan Park, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 17/885,394

(22) Filed: Aug. 10, 2022

(65) Prior Publication Data

US 2024/0056967 A1    Feb. 15, 2024

(51) Int. Cl.
*H04W 52/02* (2009.01)
*H04L 5/00* (2006.01)

(52) U.S. Cl.
CPC ....... *H04W 52/0216* (2013.01); *H04L 5/0051* (2013.01); *H04W 52/0229* (2013.01)

(58) Field of Classification Search
CPC .......... H04W 52/0216; H04W 52/0229; H04L 5/0051
See application file for complete search history.

(56) References Cited

U.S. PATENT DOCUMENTS

2024/0015655 A1*   1/2024   Cheng ................. H04L 27/2602

FOREIGN PATENT DOCUMENTS

| WO | WO-2018132100 A1 | 7/2018 |
| WO | WO-2018175760 A1 | 9/2018 |
| WO | WO-2020200840 A1 | 10/2020 |

OTHER PUBLICATIONS

Ericsson: "Design of Paging Enhancements", 3GPP TSG RAN WG1 #106-e, 3GPP Draft, R1-2107998, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, pp. 1-16, XP052038765.
International Search Report and Written Opinion—PCT/US2023/071359—ISA/EPO—Dec. 6, 2023.

* cited by examiner

*Primary Examiner* — Duc C Ho
(74) *Attorney, Agent, or Firm* — Guang Y. Zhang; Harrity & Harrity, LLP

(57) ABSTRACT

Various aspects of the present disclosure generally relate to wireless communication. In some aspects, a user equipment (UE) may detect, using a low-power receiver of the UE, a low-power synchronization signal (LP-SS) that is associated with a first coverage area that is larger than a second coverage area associated with a legacy synchronization signal block. The UE may monitor, using the low-power receiver, for a low-power wake up signal, based at least in part on the LP-SS, that is associated with a third coverage area that is larger than a fourth coverage area associated with a legacy wake up signal. Numerous other aspects are described.

30 Claims, 11 Drawing Sheets

LOW-POWER SYNCHRONIZATION SIGNALS AND WAKE UP SIGNALS

FIELD OF THE DISCLOSURE

Aspects of the present disclosure generally relate to wireless communication and to techniques and apparatuses for transmitting and receiving low-power synchronization signals and wake up signals.

BACKGROUND

Wireless communication systems are widely deployed to provide various telecommunication services such as telephony, video, data, messaging, and broadcasts.

Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to detect, using a low-power receiver of the UE, a low-power synchronization signal (LP-SS), wherein the LP-SS is associated with a first coverage area that is larger than a second coverage area associated with a legacy synchronization signal block (SSB). The one or more processors may be configured to monitor, using the low-power receiver, for a low-power wake up signal (LP-WUS) based at least in part on the LP-SS, wherein the LP-WUS is associated with a third coverage area that is larger than a fourth coverage area associated with a legacy wake up signal (WUS).

Some aspects described herein relate to an apparatus for wireless communication at a network entity. The apparatus may include a memory and one or more processors coupled to the memory. The one or more processors may be configured to transmit an LP-SS, wherein the LP-SS is associated with a first coverage area that is larger than a second coverage area associated with a legacy SSB. The one or more processors may be configured to transmit an LP-WUS associated with the LP-SS, wherein the LP-WUS is associated with a third coverage area that is larger than a fourth coverage area associated with a legacy WUS.

Some aspects described herein relate to a method of wireless communication performed by a UE. The method may include detecting, using a low-power receiver of the UE, an LP-SS, wherein the LP-SS is associated with a first coverage area that is larger than a second coverage area associated with a legacy SSB. The method may include monitoring, using the low-power receiver, for an LP-WUS based at least in part on the LP-SS, wherein the LP-WUS is associated with a third coverage area that is larger than a fourth coverage area associated with a legacy WUS.

Some aspects described herein relate to a method of wireless communication performed by a network entity. The method may include transmitting an LP-SS, wherein the LP-SS is associated with a first coverage area that is larger than a second coverage area associated with a legacy SSB. The method may include transmitting an LP-WUS associated with the LP-SS, wherein the LP-WUS is associated with a third coverage area that is larger than a fourth coverage area associated with a legacy WUS.

Some aspects described herein relate to a non-transitory computer-readable medium that stores a set of instructions for wireless communication by a UE. The set of instructions, when executed by one or more processors of the UE, may cause the UE to detect, using a low-power receiver of the UE, an LP-SS, wherein the LP-SS is associated with a first coverage area that is larger than a second coverage area associated with a legacy SSB. The set of instructions, when executed by one or more processors of the UE, may cause the UE to monitor, using the low-power receiver, for an LP-WUS based at least in part on the LP-SS, wherein the LP-WUS is associated with a third coverage area that is larger than a fourth coverage area associated with a legacy WUS.

Some aspects described herein relate to a non-transitory computer-readable medium that stores a set of instructions for wireless communication by a network entity. The set of instructions, when executed by one or more processors of the network entity, may cause the network entity to transmit an LP-SS, wherein the LP-SS is associated with a first coverage area that is larger than a second coverage area associated with a legacy SSB. The set of instructions, when executed by one or more processors of the network entity, may cause the network entity to transmit an LP-WUS associated with the LP-SS, wherein the LP-WUS is associated with a third coverage area that is larger than a fourth coverage area associated with a legacy WUS.

Some aspects described herein relate to an apparatus for wireless communication. The apparatus may include means for detecting, using a low-power receiver of the apparatus, an LP-SS, wherein the LP-SS is associated with a first coverage area that is larger than a second coverage area associated with a legacy SSB. The apparatus may include means for monitoring, using the low-power receiver, for an LP-WUS based at least in part on the LP-SS, wherein the LP-WUS is associated with a third coverage area that is larger than a fourth coverage area associated with a legacy WUS.

Some aspects described herein relate to an apparatus for wireless communication. The apparatus may include means for transmitting an LP-SS, wherein the LP-SS is associated with a first coverage area that is larger than a second coverage area associated with a legacy SSB. The apparatus may include means for transmitting an LP-WUS associated with the LP-SS, wherein the LP-WUS is associated with a third coverage area that is larger than a fourth coverage area associated with a legacy WUS.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
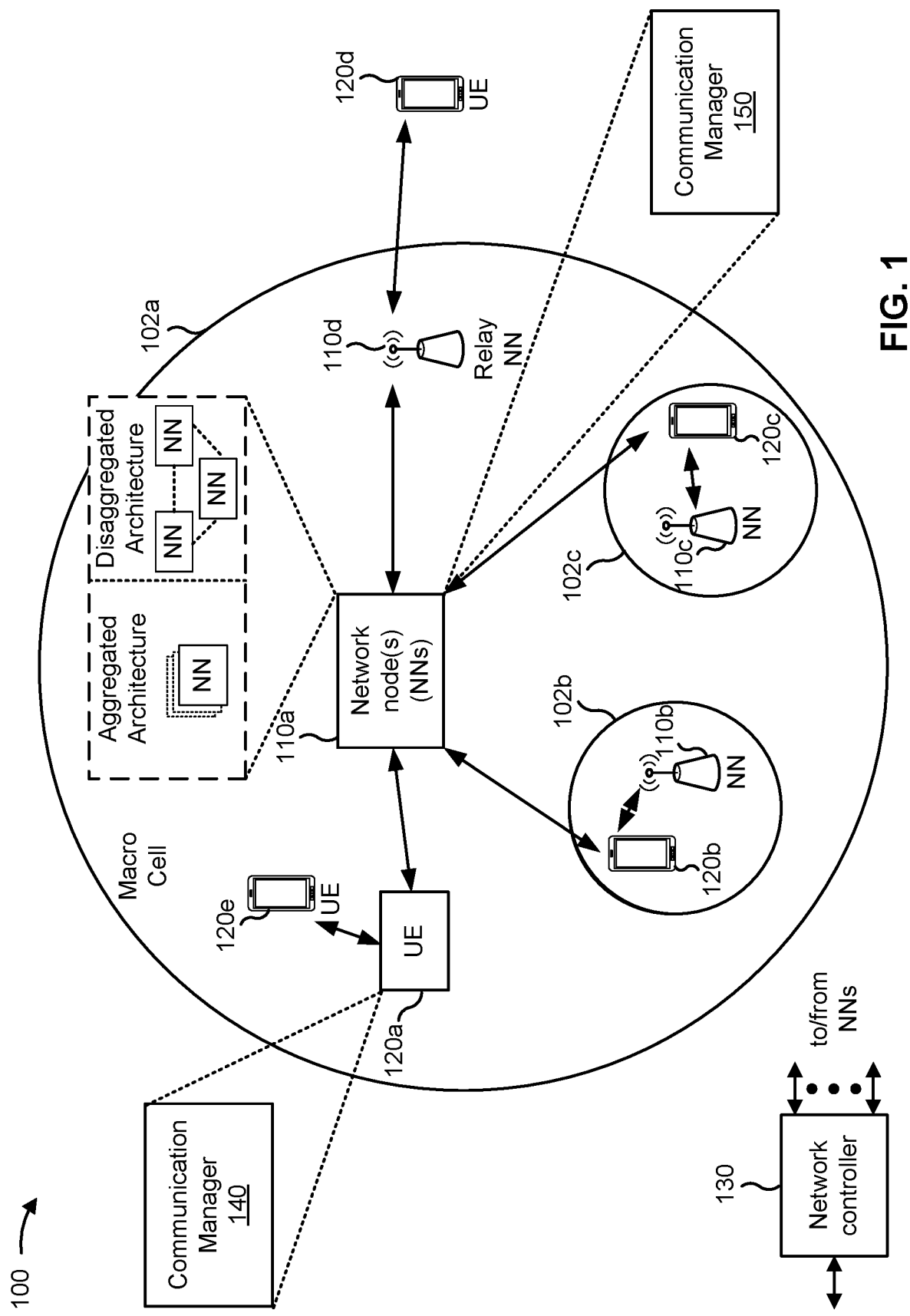
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may detect, using a low-power receiver of the UE 120, a low-power synchronization signal (LP-SS), that is associated with a first coverage area that is larger than a second coverage area associated with a legacy synchronization signal block (SSB) and may monitor, using the low-power receiver, for a low-power wake up signal (LP-WUS), based at least in part on the LP-SS, that is associated with a third coverage area that is larger than a fourth coverage area associated with a legacy wake up signal (WUS). Additionally, or alternatively, the communication manager 140 may perform one or more other operations described herein.

In some aspects, a network entity (e.g., the network node 110) may include a communication manager 150. As described in more detail elsewhere herein, the communication manager 150 may transmit an LP-SS that is associated with a first coverage area that is larger than a second coverage area associated with a legacy SSB and may transmit an LP-WUS, associated with the LP-SS, that is associated with a third coverage area that is larger than a fourth coverage area associated with a legacy WUS. Additionally, or alternatively, the communication manager 150 may perform one or more other operations described herein.

As indicated above, FIG. 1 is provided as an example. Other examples may differ from what is described with regard to FIG. 1.

Figure 2:
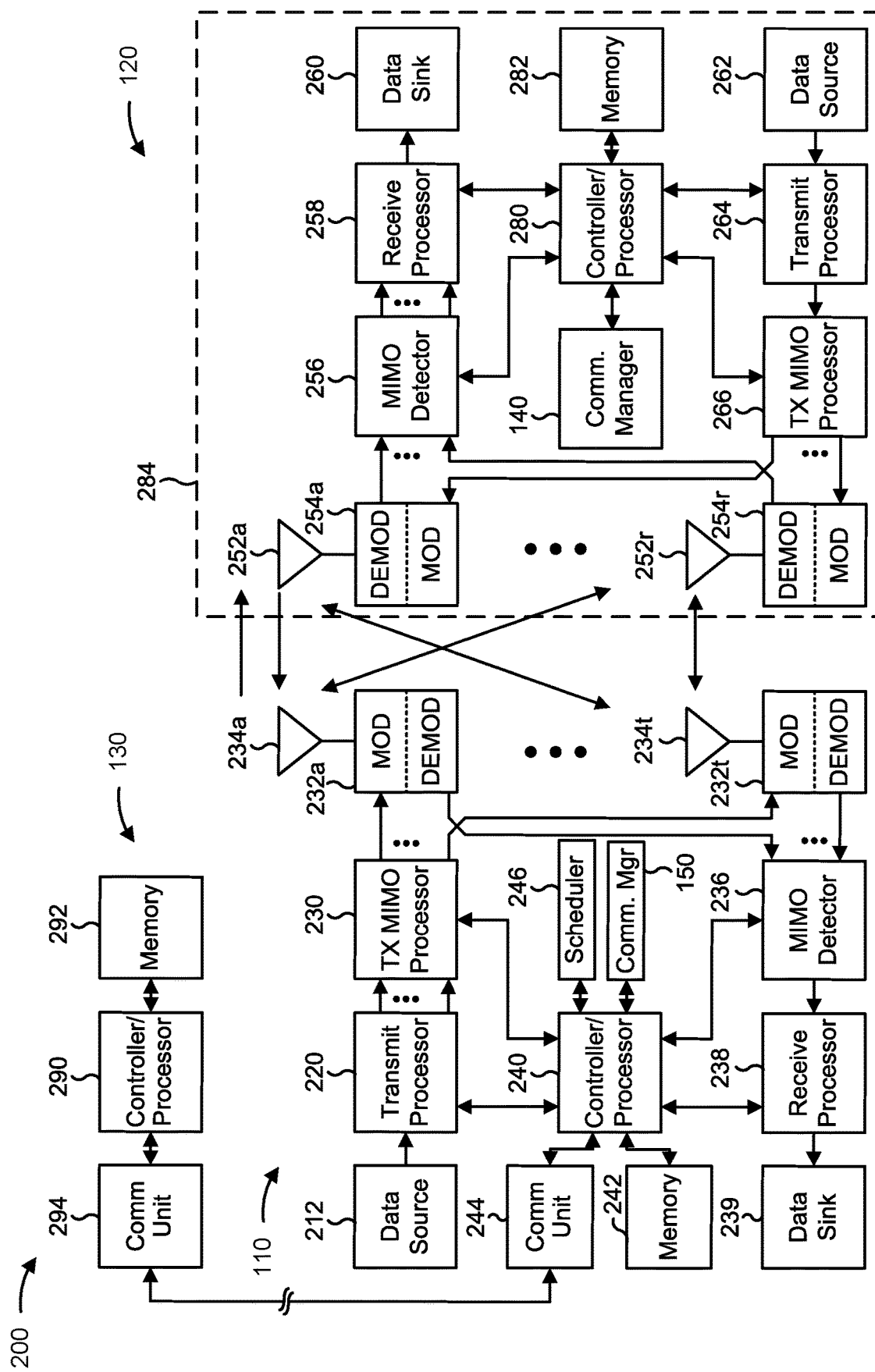
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the network node 110, the controller/processor 280 of the UE 120, and/or any other component(s) of FIG. 2 may perform one or more techniques associated with transmitting and receiving LP-SSs and LP-WUSs, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 1000 of FIG. 10) may include means for detecting, using a low-power receiver of the UE, an LP-SS, wherein the LP-SS is associated with a first coverage area that is larger than a second coverage area associated with a legacy SSB; and/or means for monitoring, using the low-power receiver, for an LP-WUS based at least in part on the LP-SS, wherein the LP-WUS is associated with a third coverage area that is larger than a fourth coverage area associated with a legacy WUS. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., the network node 110 and/or apparatus 1100 of FIG. 11) may include means for transmitting an LP-SS, wherein the LP-SS is associated with a first coverage area that is larger than a second coverage area associated with a legacy SSB; and/or means for transmitting an LP-WUS associated with the LP-SS, wherein the LP-WUS is associated with a third coverage area that is larger than a fourth coverage area associated with a legacy WUS. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base-station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
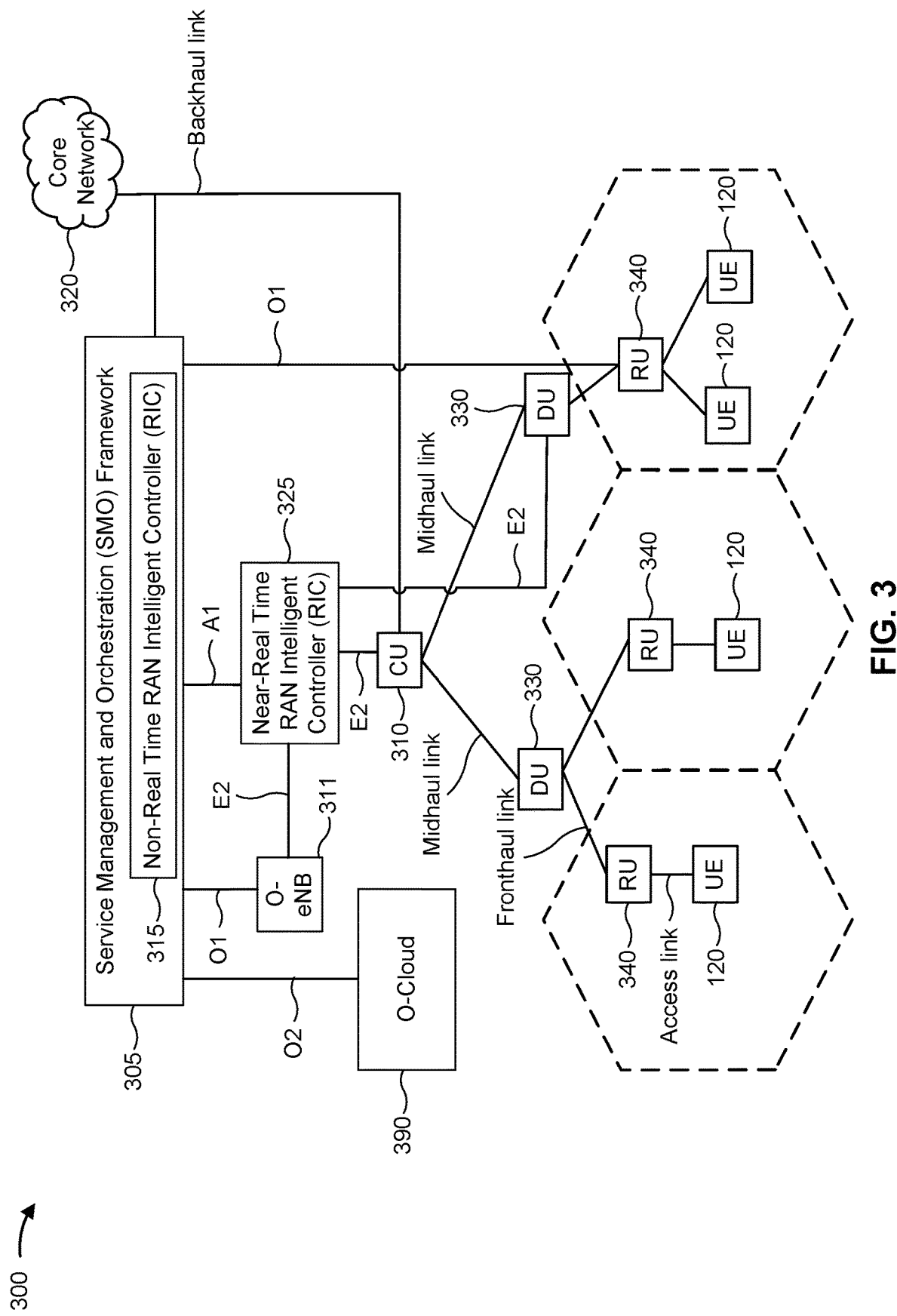
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A UE may conserve power and processing resources by deactivating a receiver (e.g., an antenna and optionally including integrated electronics, such as an amplifier, an analog-to-digital (ADC) converter, a digital-to-analog converter (DAC), and/or another similar electronic device) when the UE is not scheduled to transmit to, or receive from, a network. However, the UE generally still performs measurements (e.g., of legacy SSBs) and performs radio resource management (RRM) based on the measurements. Moreover, the UE generally monitors for legacy WUSs from the network to determine when the UE should re-establish an RRC connection with the network. These procedures increase power and processing resource consumption at the UE.

Additionally, the UE may perform a cell selection procedure (also referred to as "cell reselection" when switching from a current serving cell to a new serving cell) when moving between coverage areas associated with the legacy SSBs and the legacy WUSs. Cell selection includes measurements, transmissions, and receptions that all increase power and processing resource consumption at the UE.

Some techniques and apparatuses described herein enable a network entity (e.g., network node 110, such as an RU 340 or a controller of the RU 340 such as a CU 310 and/or a DU 330) to transmit an LP-SS with a larger coverage area than a legacy SSB. A UE (e.g., UE 120) may measure the LP-SS using a low-power receiver such that the main receiver of the UE 120 remains deactivated. As a result, power and processing resource consumption at the UE 120 is reduced. Additionally, because the LP-SS is associated with a larger coverage area, the UE 120 may perform cell reselection less frequently. As a result, power and processing resource consumption at the UE 120 is further reduced.

Similarly, some techniques and apparatuses described herein enable the network node 110 to transmit an LP-WUS with a larger coverage area than a legacy WUS. The UE 120 may monitor for the LP-WUS using the low-power receiver such that the main receiver of the UE 120 remains deactivated. As a result, power and processing resource consumption at the UE 120 is reduced.

Figure 4:
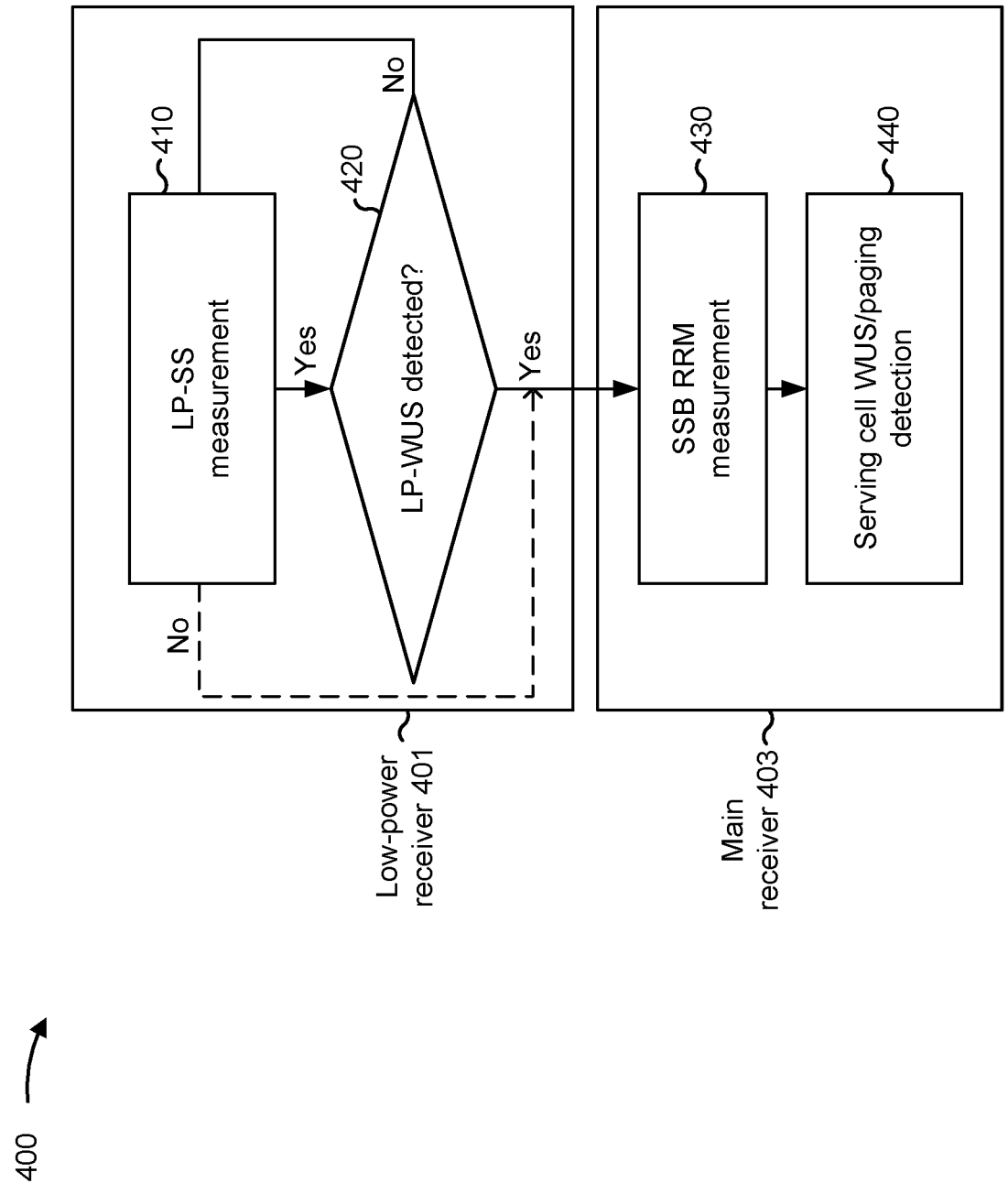
FIG. 4 is a diagram illustrating an example associated with receivers in a UE, in accordance with the present disclosure.

FIG. 4 is a diagram illustrating an example 400 associated with receivers in a UE (e.g., UE 120), in accordance with the present disclosure. As shown in FIG. 4, example 400 includes a low-power receiver 401 and a main receiver 403. Receivers 401 and 403 may each include at least one antenna and one or more integrated electronics, such as an amplifier, an ADC converter, a DAC, and/or another similar electronic device. In some aspects, the low-power receiver 401 and the main receiver 403 may share one or more electronic devices (e.g., an amplifier, a filter, an integrated circuit (IC) configured for FFT or another similar type of operation, and/or another type of IC). The low-power receiver 401 is associated with a lower voltage and/or lower current than the main receiver 403. Accordingly, the low-power receiver 401 may be associated with longer battery life for the UE 120 when the low-power receiver 401 is used instead of the main receiver 403.

As shown in FIG. 4 and by reference number 410, the UE 120 may use the low-power receiver 401 for LP-SS measurement. The LP-SS may be an electromagnetic signal transmitted by a network (e.g., from a network node 110 that includes, or at least controls, an RU 340) and generated based at least in part on a sequence. For example, the network may use a Zadoff-Chu sequence, a sequence based on a waveform based on on-off keying (OOK) and/or frequency-shift keying (FSK), or another type of sequence to generate the LP-SS. As described in connection with FIG. 5, the LP-SS may be associated with a first coverage area that is larger than a second coverage area associated with a legacy SSB.

The UE 120 may measure a received power (e.g., an RSRP) associated with the LP-SS. When the received power of an LP-SS in a current area (e.g., associated with a serving cell for the UE 120) or a neighbor area (e.g., an area associated with a neighbor cell, such as a cell adjacent to the serving cell) fails to satisfy a received power threshold, the UE 120 may activate the main receiver 403. For example, the UE 120 may perform cell reselection with the main receiver 403, based on the LP-SS being too weak, in order to reestablish an RRC connection with the network. Similarly, when the low-power receiver 401 fails to detect the LP-SS (e.g., in the current area or a neighbor area), the UE 120 may activate the main receiver 403. For example, the UE 120 may perform cell reselection with the main receiver 403, based on the LP-SS being undetectable, in order to reestablish an RRC connection with the network. As a result, the UE 120 reduces the chances of missing a WUS from the network, which would waste power and processing resources at the network as well as increase latency between the network and the UE 120.

Additionally, or alternatively, the UE 120 may determine that a distance between the UE 120 and an edge of the first coverage area associated with the LP-SS satisfies a distance threshold. The UE 120 may track a location of the UE 120 (e.g., using a global navigation satellite system (GNSS) and/or measurements of the LP-SS, among other examples). Additionally, the UE 120 may receive an indication of the first coverage area (e.g., in a configuration for the LP-SS, as described in connection with FIG. 7). Therefore, the UE 120 may determine the distance between the location of the UE 120 and the edge of the first coverage area. The UE 120 may activate the main receiver 403 based at least in part on the distance satisfying the distance threshold. For example, the UE 120 may perform cell reselection with the main receiver 403, based on the UE 120 being located at the edge, in order to reestablish an RRC connection with the network. As a result, the UE 120 reduces the chances of missing a WUS from the network, which would waste power and processing resources at the network as well as increase latency between the network and the UE 120.

On the other hand, when the UE 120 detects the LP-SS (and when the received power of LP-SS satisfies the received power threshold), the UE 120 may use the low-power receiver 401 for LP-WUS monitoring, as shown by reference number 420. The LP-WUS may be an electromagnetic signal transmitted by the network (e.g., from a network node 110 that includes, or at least controls, an RU 340) and encoding an identifier associated with the UE 120 (e.g., a UE ID or another type of identifier associated with the UE 120). As described in connection with FIG. 5, the LP-WUS may be associated with a third coverage area that is larger than a fourth coverage area associated with a legacy WUS.

When the UE 120 does not detect the LP-WUS, the UE 120 may keep the main receiver 403 deactivated and use the low-power receiver 401 to measure a subsequent transmission of the LP-SS. As a result, the UE 120 continues to conserve power and processing resources.

As further shown in FIG. 4 and by reference number 430, when the UE 120 detects the LP-WUS, the UE 120 may activate the main receiver 403 to perform one or more measurements of one or more legacy SSBs of the serving cell and/or one or more neighbor cells. Accordingly, the network may configure UE to perform RRM based at least in part on the paging periodicity. Additionally, in some aspects, the UE 120 may perform cell reselection based on one or more results of the RRM. As a result, the UE 120 improves quality and reliability of communications with the network.

As shown by reference number 440, the UE 120 may further use the main receiver 403 to detect a legacy WUS from the network and/or receive (and decode) legacy paging messages from the network. For example, the UE 120 may monitor a paging occasion using the main receiver 403 to receive (and decode) a physical downlink control channel (PDCCH) message (or another type of legacy paging message) that encodes an identifier associated with the UE 120 (e.g., a UE ID or another type of identifier associated with the UE 120). Accordingly, the UE 120 may determine to re-establish an RRC connection with the network (e.g., via a random access channel (RACH) procedure), when the PDCCH message indicates that the UE 120 is being paged, so that the network can transmit data to the UE 120.

By using techniques as described in connection with FIG. 4, the UE 120 may measure the LP-SS using the low-power receiver 401 such that the main receiver 403 of the UE 120 remains deactivated. As a result, power and processing resources are conserved at the UE 120. Additionally, the UE 120 may monitor for the LP-WUS using the low-power receiver 401 such that the main receiver 403 of the UE 120 remains deactivated. As a result, power and processing resources are conserved at the UE 120.

As indicated above, FIG. 4 is provided as an example. Other examples may differ from what is described with respect to FIG. 4.

Figure 5:
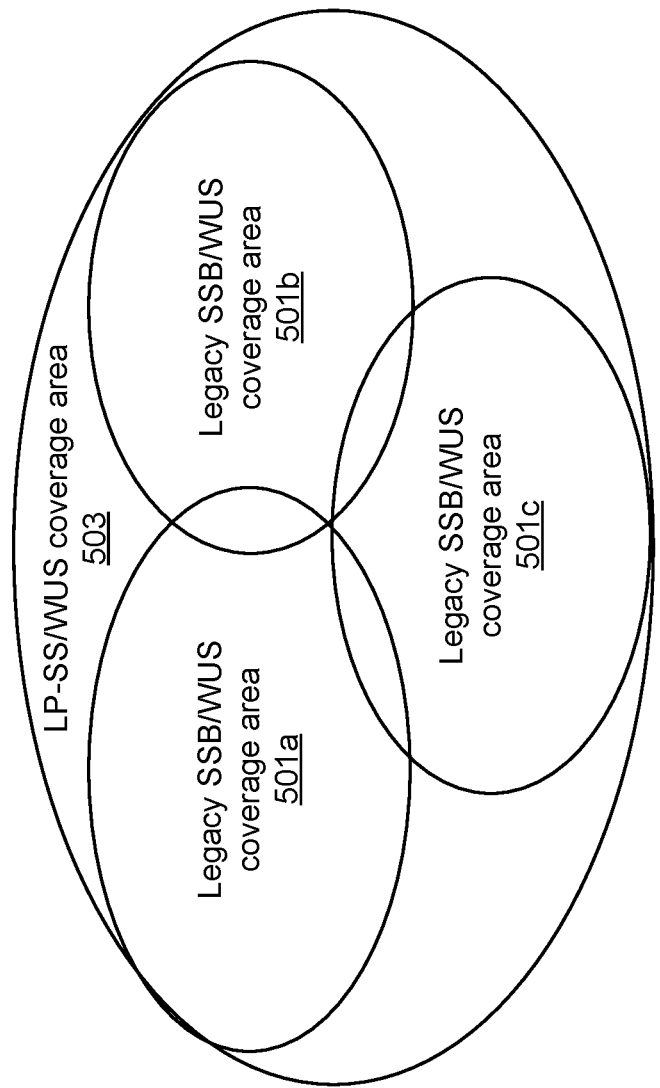
FIG. 5 is a diagram illustrating an example associated with synchronization signal and wake up signal (WUS) coverage areas, in accordance with the present disclosure.

FIG. 5 is a diagram illustrating an example 500 associated with synchronization signal and WUS coverage areas, in accordance with the present disclosure. As shown in FIG. 5, example 500 includes coverage areas 501 associated with legacy signals. For example, coverage area 501*a* may be associated with a first cell, coverage area 501*b* may be associated with a second cell, and coverage area 501*c* may be associated with a third cell. Although described in connection with three cells, other examples may include fewer cells (e.g., two cells or one cell) or additional cells (e.g., four cells, five cells, and so on).

Each coverage area may be associated with at least one corresponding legacy SSB. For example, the coverage area 501*a* may be associated with one or more first SSBs transmitted within the first cell, the coverage area 501*b* may be associated with one or more second SSBs transmitted within the second cell, and the coverage area 501*c* may be associated with one or more third SSBs transmitted within the third cell. In example 500, each coverage area is further associated with at least one corresponding legacy WUS. For example, the coverage area 501*a* may be associated with one or more first WUSs transmitted within the first cell, the coverage area 501*b* may be associated with one or more second WUSs transmitted within the second cell, and the coverage area 501*c* may be associated with one or more third WUSs transmitted within the third cell. Other examples may include different coverage areas for SSBs as compared with WUSs. For example, the first cell may use a different transmit power, subcarrier spacing (SCS), and/or transmission beam, among other examples, for the first WUS(s) as compared with the first SSB(s). Accordingly, the coverage area associated with the first WUS(s) may be larger or smaller than the coverage area associated with the first SSB(s).

As further shown in FIG. 5, example 500 includes a coverage area 503 associated with an LP-SS and an LP-WUS. The coverage area 503 is larger than the coverage area 501*a*, the coverage area 501*b*, and the coverage area 501*c* (as well as the union thereof). In order to achieve the larger coverage area 503, the LP-SS (and the LP-WUS) may be associated with a first band that is lower (in frequency) than a second band associated with the legacy SSB (and the legacy WUS). As used herein, "band" refers to a set of frequencies that span a bandwidth. Because lower bands are less susceptible to interference and absorption due to smaller penetration loss, the resultant coverage area 503 is larger than the coverage area 501*a*, the coverage area 501*b*, and the coverage area 501*c*. For example, the LP-SS (and the LP-WUS) may be transmitted in an FR1 band and the legacy SSB (and the legacy WUS) may be transmitted in an FR2 band. In another example, the LP-SS (and the LP-WUS) may be transmitted in a sub-1 GHz band and the legacy SSB (and the legacy WUS) may be transmitted in a sub-6 GHz band (e.g., above 1 GHz).

Additionally, or alternatively, the LP-SS (and the LP-WUS) may be associated with a first SCS that is smaller than a second SCS associated with the legacy SSB (and the legacy WUS). Additionally, or alternatively the LP-SS (and the LP-WUS) may be associated with a first cyclic prefix (CP) associated with the first SCS that is longer than a second CP associated with the second SCS associated with the legacy SSB (and the legacy WUS). Because smaller SCSs result in electromagnetic signals with longer OFDM symbol durations and because longer CPs are less susceptible to timing errors, the resultant coverage area 503 is larger than the coverage area 501a, the coverage area 501b, and the coverage area 501c.

Additionally, or alternatively, the LP-SS (and the LP-WUS) may be associated with a first transmit power that is higher than a second transmit associated with the legacy SSB (and the legacy WUS) such that the resultant coverage area 503 is larger than the coverage area 501a, the coverage area 501b, and the coverage area 501c. Additionally, or alternatively, the LP-SS (and the LP-WUS) may be associated with a first set of transmission beams in which each beam is wider than each beam in a second set of transmission beams associated with the legacy SSB (and the legacy WUS). For example, the LP-SS (and the LP-WUS) may be transmitted using a single beam with consecutive repetitions and/or using inter-cell interference coordination, and the legacy SSB (and the legacy WUS) may be transmitted using multi-beam sweeping within each cell. As a result, the coverage area 503 is larger than the coverage area 501a, the coverage area 501b, and the coverage area 501c. Additionally, a low-power receiver of a UE 120 may be less complex and consume less power than a main receiver of the UE 120 because of the lower band, smaller SCS, longer CP and/or fewer quantity of beams associated with the LP-SS (and the LP-WUS) as compared with the legacy SSB (and the legacy WUS).

Additionally, or alternatively, the LP-SS (and the LP-WUS) may be associated with a single-frequency network (SFN) with a multi-cell joint scheduling mode. In other words, network nodes of the first cell, the second cell, and the third cell may coordinate (e.g., on wireless and/or wired backhaul connections) to transmit the LP-SS (and the LP-WUS) simultaneously on a same frequency (or frequencies). As a result, the coverage area 503 is larger than the coverage area 501a, the coverage area 501b, and the coverage area 501c. Accordingly, the legacy SSB (and the legacy WUS) may be associated with a single-cell scheduling mode within the SFN area (or with a multi-frequency network including the same network nodes and/or at least one different network node).

Other examples may include a different coverage area for the LP-SS as compared with the LP-WUS. For example, the cells may use a different transmit power, SCS, and/or transmission beam, among other examples, for the LP-WUS as compared with the LP-SS. Accordingly, the coverage area associated with the LP-SS may be larger or smaller than the coverage area associated with the LP-WUS.

By using techniques as described in connection with FIG. 5, because the LP-SS and the LP-WUS are associated with the larger coverage area 503, the UE 120 may perform cell reselection less frequently. As a result, the UE 120 conserves power and processing resources.

As indicated above, FIG. 5 is provided as an example. Other examples may differ from what is described with respect to FIG. 5.

Figure 6:
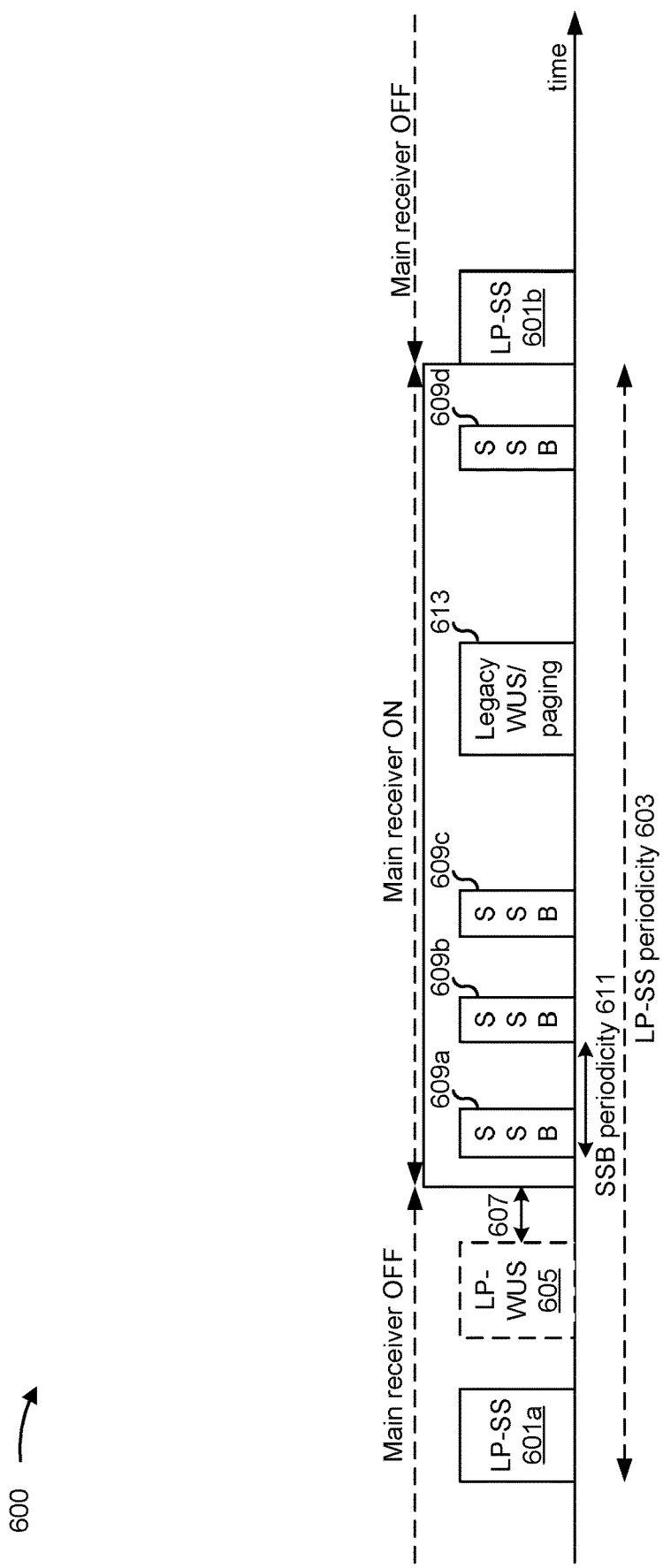
FIG. 6 is a diagram illustrating an example associated with transmitting and receiving low-power synchronization signals (LP-SSs) and low-power wake up signals (LP-WUSs), in accordance with the present disclosure.

FIG. 6 is a diagram illustrating an example 600 associated with transmitting and receiving LP-SSs and LP-WUSs, in accordance with the present disclosure. As shown in FIG. 6, example 600 includes an LP-SS that is transmitted by a network (e.g., via a network node 110, such as an RU 340 or a controller of the RU 340 like a CU 310 and/or a DU 330) periodically. In example 600, LP-SS instance 601a is separated in time from LP-SS instance 601b by the LP-SS periodicity 603. As further shown in FIG. 6, the LP-SS instances 601a and 601b may be received (e.g., by a UE 120) when a main receiver of the UE 120 is deactivated (e.g., as described in connection with FIG. 4).

Example 600 further includes an LP-WUS 605 that is transmitted by the network whenever the network pages the UE 120 (e.g., when a buffer associated with the UE 120 has data to deliver to the UE 120). As further shown in FIG. 6, the LP-WUS 605 may be received by the UE 120 when a main receiver of the UE 120 is deactivated (e.g., as described in connection with FIG. 4). The UE 120 may activate the main receiver based at least in part on detecting the LP-WUS 605.

In some aspects, a gap 607 (in time) may separate an end of a monitoring occasion associated with the LP-WUS 605 from activation of the main receiver of the UE 120 (e.g., in order to monitor a legacy SSB). Accordingly, the UE 120 may activate and configure (e.g., in hardware and/or software) the main receiver of the UE 120 before using the main receiver. As described in connection with FIG. 7, the network may configure a gap (in time) between the end of the monitoring occasion associated with the LP-WUS 605 from a start of a transmission of the legacy SSB. Accordingly, the UE 120 is aware that the gap 607 should be no longer than the gap configured by the network. In some aspects, the gap is based at least in part on a first band associated with the LP-WUS 605 (and/or the LP-SS), a second band associated with the legacy SSB, a first SCS associated with the LP-WUS 605 (and/or the LP-SS), and/or a second SBS associated with the legacy SSB. For example, the network may configure a longer gap when a difference between the first SCS and the second SCS is larger and/or when a difference between the first band and the second band is larger. A longer gap allows for the UE 120 to configure the main receiver more accurately, which increases quality and reliability of communication between the network and the UE 120. Similarly, the network may configure a shorter gap when a difference between the first SCS and the second SCS is smaller and/or when a difference between the first band and the second band is smaller. A shorter gap reduces latency between the LP-WUS 605 and the UE 120 receiving data from the network. Additionally, or alternatively, the gap may be based at least in part on a device type (e.g., a make, a model, and/or a 3GPP release associated with the UE 120), a type of the low-power receiver (e.g., a make or a model), and/or a type of the main receiver (e.g., a make or a model). For example, the gap may be longer when the UE 120 is associated with less complexity, such that the UE 120 uses more time for RF retuning.

The LP-WUS 605 may be quasi-co-located (QCL'd) with the LP-SS. For example, the LP-WUS 605 may be associated with a transmission configuration indicator (TCI) state that indicates the LP-SS as a source reference signal. As a result, the UE 120 may monitor for the LP-WUS 605 without having to activate the main receiver of the UE 120 (because a low-power receiver of the UE 120 can measure the LP-SS, as described in connection with FIG. 4).

As further shown in FIG. 6, the UE 120 may activate the main receiver for an amount of time. The amount of time may be preconfigured (e.g., stored in a memory of the UE 120 and/or otherwise programmed into the UE 120) according to 3GPP specifications and/or another standard. Additionally, or alternatively, the UE 120 may use a timer value indicated by the network and associated with activation of the main receiver of the UE 120. In a combinatory example, the network may select a timer value from a plurality of possible timer values that are preconfigured (e.g., stored in the memory of the UE 120 and/or otherwise programmed into the UE 120) according to 3GPP specifications and/or another standard. The network may use a longer timer value when the UE 120 is associated with a level of data traffic that satisfies a traffic threshold. A longer timer value allows for more accurate RRM by the network because the UE 120 performs more legacy SSB measurements, which increases quality and reliability of communication with the UE 120. The network may use a shorter timer value when the UE 120 is associated with a level of data traffic that fails to satisfy a traffic threshold. A shorter timer value conserves power and processing resources at the UE 120. Additionally, or alternatively, the timer value may be based at least in part on a device type (e.g., a make, a model, and/or a 3GPP release associated with the UE 120), a type of the low-power receiver (e.g., a make or a model), and/or a type of the main receiver (e.g., a make or a model). For example timer value may be longer when the UE 120 is associated with less complexity, such that the UE 120 uses more time for synchronization and system information block (SIB) detection.

As further shown in FIG. 6, the UE 120 may measure legacy SSB instances (e.g., SSB instances 609*a*, 609*b*, 609*c*, and 609*d*) when the main receiver of the UE 120 is activated. Accordingly, the UE 120 may perform measurements based on the legacy SSB instances for RRM. The legacy SSBs may be associated with a periodicity 611 that is shorter than the periodicity 603 associated with the LP-SS. As a result, the UE 120 conserves power and processing resources whenever the UE 120 measures the LP-SS rather than the legacy SSBs because the LP-SS is less frequent in time.

Additionally, the UE 120 may monitor for a legacy WUS and/or a legacy paging message 613 when the main receiver of the UE 120 is activated. Accordingly, the UE 120 may determine when to re-establish an RRC connection with the network in order to receive data intended for the UE 120.

By using techniques as described in connection with FIG. 6, the UE 120 may measure the LP-SS instances 601*a* and 601*b* using the low-power receiver such that the main receiver of the UE 120 remains deactivated. As a result, power and processing resource consumption at the UE 120 is reduced. Similarly, the UE 120 may monitor for the LP-WUS 605 using the low-power receiver such that the main receiver of the UE 120 remains deactivated. As a result, power and processing resource consumption at the UE 120 is reduced.

As indicated above, FIG. 6 is provided as an example. Other examples may differ from what is described with respect to FIG. 6.

Figure 7:
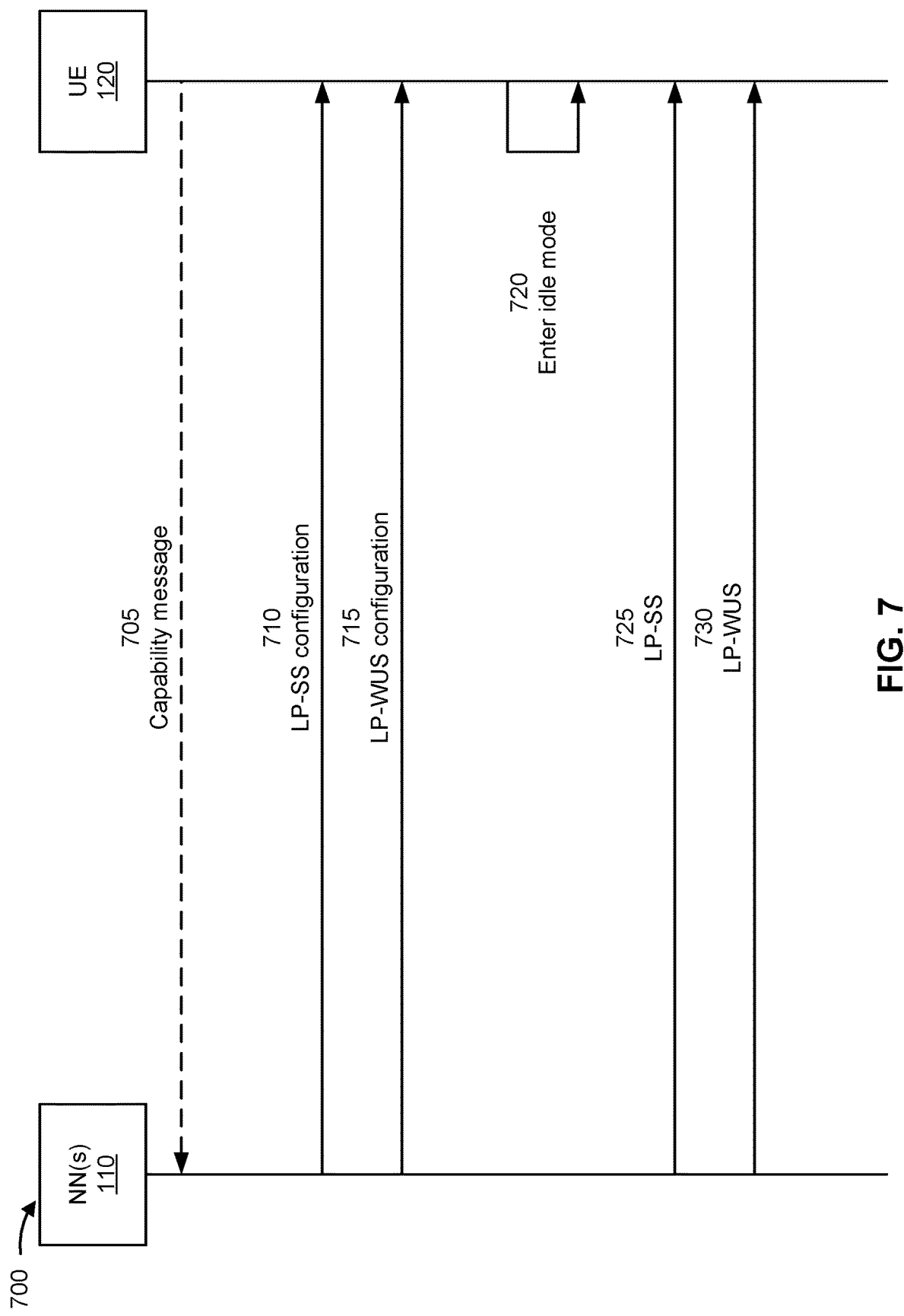
FIG. 7 is a diagram illustrating an example associated with configuring LP-SSs and LP-WUSs, in accordance with the present disclosure.

FIG. 7 is a diagram illustrating an example 700 associated with configuring LP-SSs and LP-WUSs, in accordance with the present disclosure. As shown in FIG. 7, one or more network nodes 110 and a UE 120 may communicate with one another (e.g., on a wireless network, such as wireless network 100 of FIG. 1).

As shown by reference number 705, the UE 120 may transmit, and the network node(s) 110 may receive (e.g., directly or via an RU 340), a capability message. The capability message may include a UECapabilityInformation data structure, as defined by 3GPP specifications and/or another standard. The UE 120 may transmit the capability message in response to a capability enquiry message from the network node(s) 110, such as a UECapabilityEnquiry data structure, as defined by 3GPP specifications and/or another standard.

The capability message may indicate that the UE 120 is configured to receive an LP-SS. For example, the UE 120 may indicate that the UE 120 has a low-power receiver to use for measuring the LP-SS in lieu of using a main receiver for measuring legacy SSBs. Additionally, in some aspects, the capability message may include an indication of a recommended gap (in time) between an end of a monitoring occasion associated with an LP-WUS and a start of a transmission of a legacy SSB. For example, the UE 120 may indicate an amount of time (e.g., a minimum amount of time) that the UE 120 will use to activate and configure the main receiver when the low-power receiver detects the LP-WUS.

As shown by reference number 710, the network node(s) 110 may transmit (e.g., directly or via an RU 340), and the UE 120 may receive, a configuration associated with the LP-SS. The configuration may indicate that the LP-SS will be transmitted (e.g., in response to the capability message indicating that the UE 120 is configured to receive an LP-SS). The configuration may further indicate a list of neighbor areas (e.g., cell IDs) in which the LP-SS will be transmitted. Accordingly, the UE 120 may determine when the UE 120 is near an edge of a coverage area associated with the LP-SS (e.g., as described in connection with FIG. 4). Additionally, or alternatively, the configuration may indicate a virtual cell ID associated with the LP-SS. For example, the virtual cell ID may be associated with a plurality of cells (and thus a plurality of cell IDs). The virtual cell ID may be used to generate the LP-SS (which may be a sequence-based electromagnetic signal).

Additionally, or alternatively, the configuration may indicate a band, a periodicity (and/or other time resource indications), one or more frequencies, and/or a numerology (e.g., an SCS) associated with the LP-SS, among other examples. The configuration may further indicate a CP associated with the LP-SS, which may be longer than a CP associated with the legacy SSB. Accordingly, the UE 120 may use the configuration to monitor for, and detect, the LP-SS. The configuration may further indicate a gap (in time) between an end of a monitoring occasion associated with the LP-WUS and an activation of the main receiver of the UE 120. Accordingly, the UE 120 will activate and configure the main receiver within the gap when the LP-WUS is detected (e.g., as described in connection with FIG. 4). The configuration may indicate a timer value for which the main receiver should remain activated (e.g., as described in connection with FIG. 6).

As shown by reference number 715, the network node(s) 110 may transmit (e.g., directly or via an RU 340), and the UE 120 may receive, a configuration associated with the LP-WUS. In some aspects, the configuration may indicate that the LP-WUS will be transmitted. The configuration may further indicate a list of neighbor areas (e.g., cell IDs) in which the LP-WUS will be transmitted (e.g., when different than the list of neighbor areas in which the LP-SS will be transmitted). Additionally, or alternatively, the configuration may indicate a virtual cell ID associated with the LP-WUS (e.g., when different than the virtual cell ID associated with the LP-WUS).

Additionally, or alternatively, the configuration may indicate a band, a periodicity (and/or other time resource indications), one or more frequencies, and/or a numerology (e.g., an SCS) associated with the LP-WUS, among other examples. The configuration may further indicate a CP associated with the LP-WUS, which may be longer than a CP associated with the legacy WUS. The configuration for the LP-WUS may indicate only the resource allocations that are different than the resource allocations for the LP-SS. The configuration may indicate the gap (in time) between an end of a monitoring occasion associated with the LP-WUS and an activation of the main receiver of the UE 120, and/or may indicate the timer value for which the main receiver should remain activated (e.g., as described in connection with FIG. 6).

In some aspects, the LP-SS and the LP-WUS may be multiplexed with the legacy SSB and the legacy WUS, respectively. For example, the LP-SS and the LP-WUS may be multiplexed in time with the legacy SSB and the legacy WUS, as shown in FIG. 6. Alternatively, the LP-SS and the LP-WUS may be multiplexed in frequency with the legacy SSB and the legacy WUS.

Accordingly, when the UE 120 enters an idle mode, as shown by reference number 720, the UE 120 may use the low-power receiver rather than the main receiver (e.g., as described in connection with FIG. 4). Accordingly, the UE 120 may measure the LP-SS from the network node(s) 110, as shown by reference number 725. Additionally, the UE 120 may monitor for the LP-WUS from the network node(s) 110, as shown by reference number 730.

By using techniques as described in connection with FIG. 7, the UE 120 may measure the LP-SS using the low-power receiver such that the main receiver of the UE 120 remains deactivated. As a result, power and processing resources are conserved at the UE 120. Similarly, the UE 120 may monitor for the LP-WUS using the low-power receiver such that the main receiver of the UE 120 remains deactivated. As a result, power and processing resources are conserved at the UE 120.

As indicated above, FIG. 7 is provided as an example. Other examples may differ from what is described with respect to FIG. 7.

Figure 8:
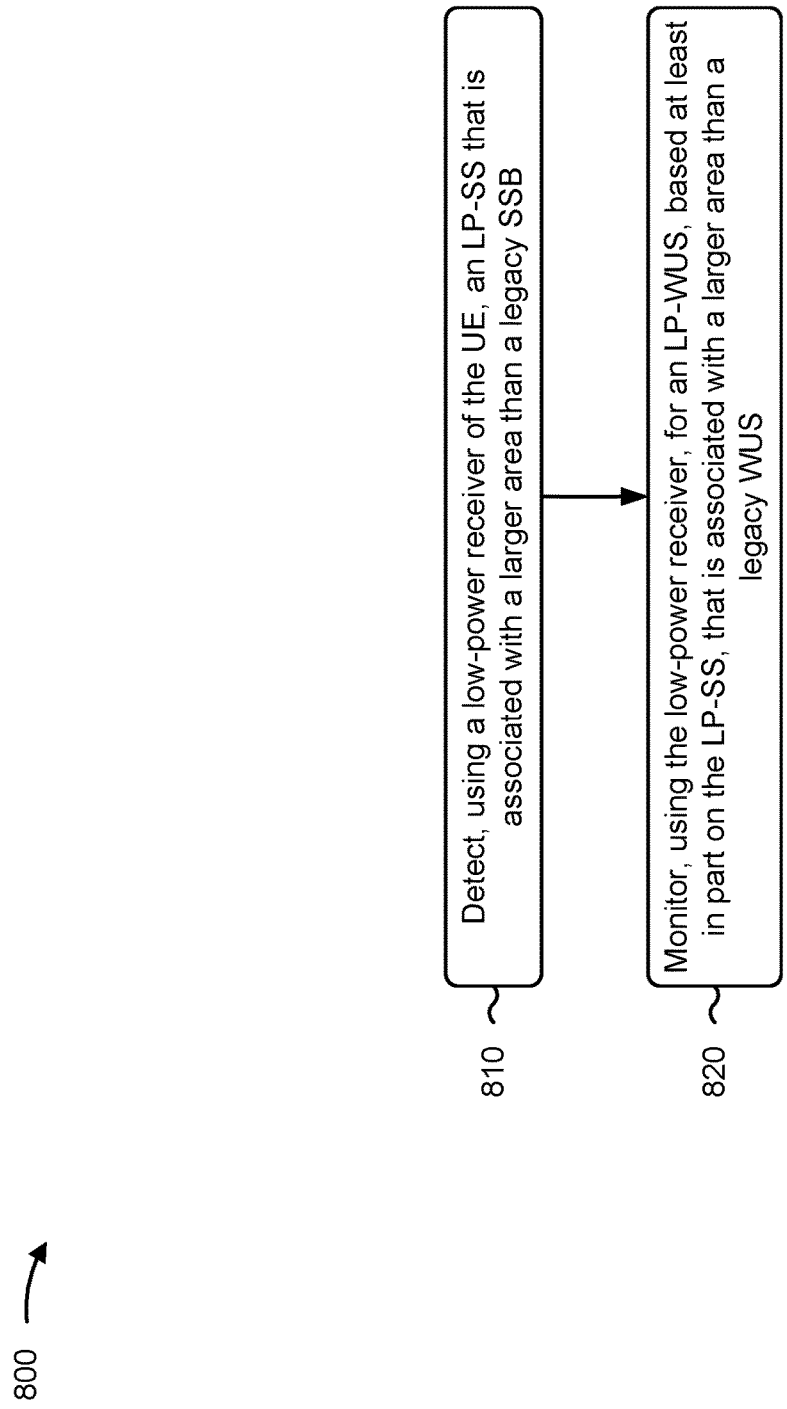
FIGS. 8 and 9 are diagrams illustrating example processes associated with transmitting and receiving LP-SSs and LP-WUSs, in accordance with the present disclosure.

FIG. 8 is a diagram illustrating an example process 800 performed, for example, by a UE, in accordance with the present disclosure. Example process 800 is an example where the UE (e.g., UE 120 and/or apparatus 1000 of FIG. 10) performs operations associated with receiving LP-SSs and LP-WUSs.

As shown in FIG. 8, in some aspects, process 800 may include detecting, using a low-power receiver of the UE, an LP-SS that is associated with a first coverage area that is larger than a second coverage area associated with a legacy SSB (block 810). For example, the UE (e.g., using communication manager 140 and/or detection component 1008, depicted in FIG. 10) may detect, using a low-power receiver of the UE, an LP-SS that is associated with a first coverage area that is larger than a second coverage area associated with a legacy SSB, as described herein.

As further shown in FIG. 8, in some aspects, process 800 may include monitoring, using the low-power receiver, for an LP-WUS, based at least in part on the LP-SS, that is associated with a third coverage area that is larger than a fourth coverage area associated with a legacy WUS (block 820). For example, the UE (e.g., using communication manager 140 and/or monitoring component 1010, depicted in FIG. 10) may monitor, using the low-power receiver, for an LP-WUS, based at least in part on the LP-SS, that is associated with a third coverage area that is larger than a fourth coverage area associated with a legacy WUS, as described herein.

Process 800 may include additional aspects, such as any single aspect or any combination of aspects described below and/or in connection with one or more other processes described elsewhere herein.

In a first aspect, the LP-SS and the LP-WUS are associated with a first band that is lower than a second band associated with the legacy SSB and the legacy WUS.

In a second aspect, alone or in combination with the first aspect, the LP-SS and the LP-WUS are associated with an SFN with a multi-cell joint scheduling mode, and the legacy SSB and the legacy WUS are associated with a single-cell scheduling mode.

In a third aspect, alone or in combination with one or more of the first and second aspects, the LP-SS and the LP-WUS are associated with a first quantity of transmission beams that is smaller than a second quantity of transmission beams associated with the legacy SSB and the legacy WUS.

Figure 10:
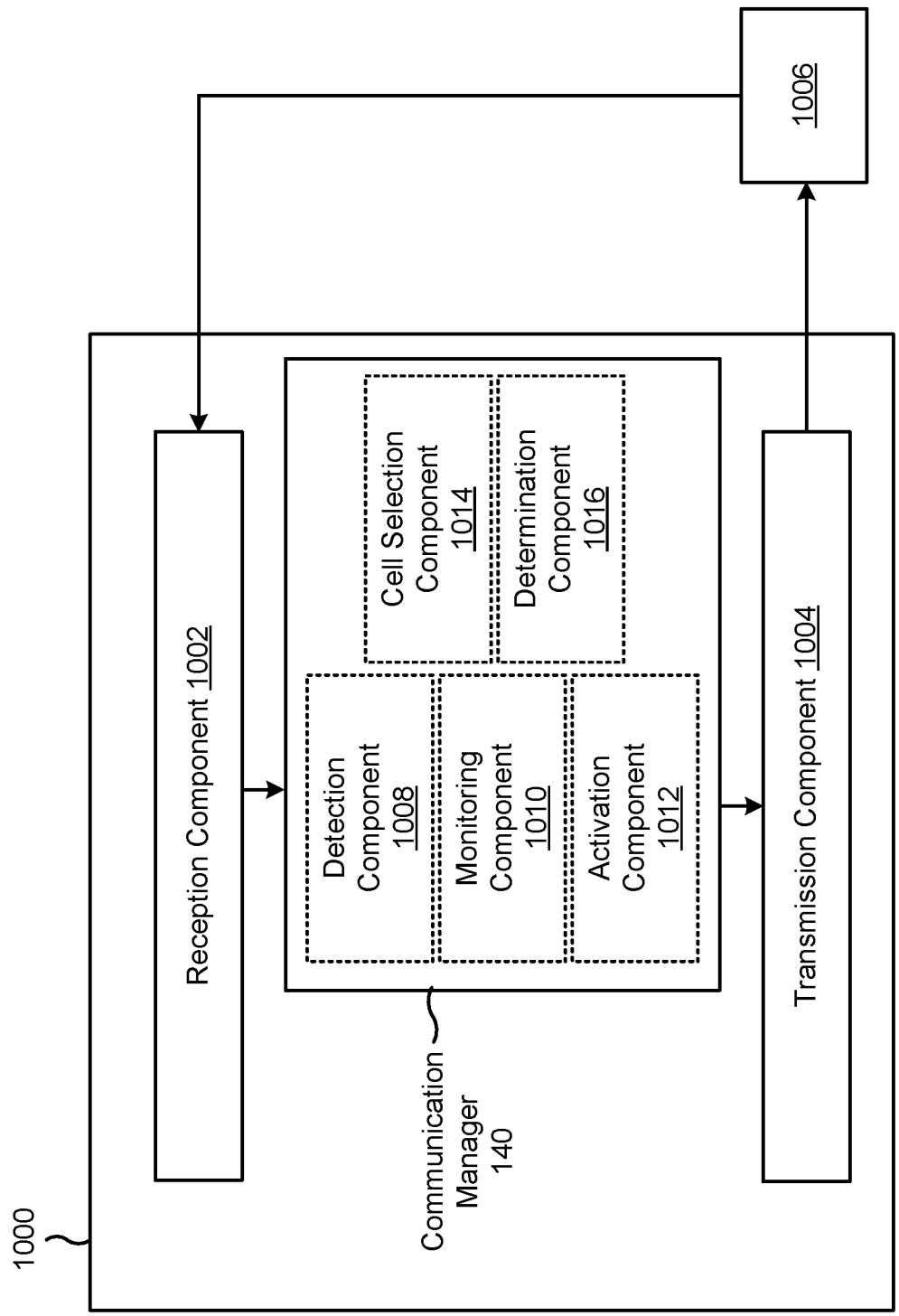
FIGS. 10 and 11 are diagrams of example apparatuses for wireless communication, in accordance with the present disclosure.

In a fourth aspect, alone or in combination with one or more of the first through third aspects, process 800 includes detecting (e.g., using communication manager 140 and/or detection component 1008) the LP-WUS, and activating a main receiver of the UE (e.g., using communication manager 140 and/or activation component 1012, depicted in FIG. 10) based at least in part on detecting the LP-WUS.

In a fifth aspect, alone or in combination with one or more of the first through fourth aspects, process 800 includes refraining from performing cell selection (e.g., using communication manager 140 and/or cell selection component 1014, depicted in FIG. 10) based at least in part on detecting the LP-SS.

In a sixth aspect, alone or in combination with one or more of the first through fifth aspects, process 800 includes determining (e.g., using communication manager 140 and/or determination component 1016, depicted in FIG. 10) that a distance between the UE and an edge of the first coverage area associated with the LP-SS satisfies a distance threshold, and activating a main receiver of the UE (e.g., using communication manager 140 and/or activation component 1012) based at least in part on determining that the distance satisfies the distance threshold.

In a seventh aspect, alone or in combination with one or more of the first through sixth aspects, process 800 includes determining (e.g., using communication manager 140 and/or determination component 1016) that a received power of the LP-SS in a current area or a neighbor area fails to satisfy a received power threshold, and activating a main receiver of the UE (e.g., using communication manager 140 and/or activation component 1012) based at least in part on determining that the received power of the LP-SS fails to satisfy the received power threshold.

In an eighth aspect, alone or in combination with one or more of the first through seventh aspects, process 800 includes failing to detect the LP-SS (e.g., using communication manager 140 and/or detection component 1008) in a current area or a neighbor area, and activating a main receiver of the UE (e.g., using communication manager 140 and/or activation component 1012) based at least in part on failing to detect the LP-SS.

In a ninth aspect, alone or in combination with one or more of the first through eighth aspects, an end of a monitoring occasion associated with the LP-WUS is separated in time, by a gap, from activation of a main receiver of the UE to monitor the legacy SSB.

In a tenth aspect, alone or in combination with one or more of the first through ninth aspects, the gap is based at least in part on a first band associated with the LP-WUS, a second band associated with the legacy SSB, a first SCS associated with the LP-WUS, and a second SCS associated with the legacy SSB.

In an eleventh aspect, alone or in combination with one or more of the first through tenth aspects, process 800 includes receiving (e.g., using communication manager 140 and/or reception component 1002, depicted in FIG. 10), from a network node, an indication of the gap.

In a twelfth aspect, alone or in combination with one or more of the first through eleventh aspects, process 800 includes transmitting (e.g., using communication manager 140 and/or transmission component 1004, depicted in FIG. 10), to the network node, an indication of a recommended gap, such that the indication of the gap is received in response to the indication of the recommended gap.

In a thirteenth aspect, alone or in combination with one or more of the first through twelfth aspects, process 800 includes receiving (e.g., using communication manager 140 and/or reception component 1002), from a network node, an indication that the LP-SS will be transmitted.

In a fourteenth aspect, alone or in combination with one or more of the first through thirteenth aspects, process 800 includes receiving (e.g., using communication manager 140 and/or reception component 1002), from a network node, a list of neighbor areas that the LP-SS will be transmitted in.

In a fifteenth aspect, alone or in combination with one or more of the first through fourteenth aspects, process 800 includes transmitting (e.g., using communication manager 140 and/or transmission component 1004), to the network node, a capability message indicating that the UE is configured to receive the LP-SS, such that the indication that the LP-SS will be transmitted is received in response to the capability message.

In a sixteenth aspect, alone or in combination with one or more of the first through fifteenth aspects, the LP-SS and the LP-WUS are associated with a same band as the legacy SSB and the legacy WUS.

In a seventeenth aspect, alone or in combination with one or more of the first through sixteenth aspects, the LP-SS and the LP-WUS are multiplexed with the legacy SSB and the legacy WUS.

In an eighteenth aspect, alone or in combination with one or more of the first through seventeenth aspects, the LP-SS is associated with a first periodicity that longer than a second periodicity associated with the legacy SSB.

In a nineteenth aspect, alone or in combination with one or more of the first through eighteenth aspects, the LP-WUS is QCL'd with the LP-SS.

In a twentieth aspect, alone or in combination with one or more of the first through nineteenth aspects, the LP-SS and the LP-WUS are associated with a first SCS that is smaller than a second SCS associated with the legacy SSB and the legacy WUS.

In a twenty-first aspect, alone or in combination with one or more of the first through twentieth aspects, the LP-SS and the LP-WUS are associated with a first CP that is longer than a second CP associated with the legacy SSB and the legacy WUS.

In a twenty-second aspect, alone or in combination with one or more of the first through twenty-first aspects, the LP-SS and the LP-WUS are associated with a virtual cell ID, and the virtual cell ID is associated with a plurality of cells.

In a twenty-third aspect, alone or in combination with one or more of the first through twenty-second aspects, process 800 includes receiving (e.g., using communication manager 140 and/or reception component 1002), from a network node, an indication of the virtual cell ID.

In a twenty-fourth aspect, alone or in combination with one or more of the first through twenty-third aspects, process 800 includes receiving (e.g., using communication manager 140 and/or reception component 1002), from a network node, a configuration associated with the LP-SS.

In a twenty-fifth aspect, alone or in combination with one or more of the first through twenty-fourth aspects, process 800 includes receiving (e.g., using communication manager 140 and/or reception component 1002), from a network node, a configuration associated with the LP-WUS.

In a twenty-sixth aspect, alone or in combination with one or more of the first through twenty-fifth aspects, process 800 includes receiving (e.g., using communication manager 140 and/or reception component 1002), from a network node, a timer value associated with activation of a main receiver of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
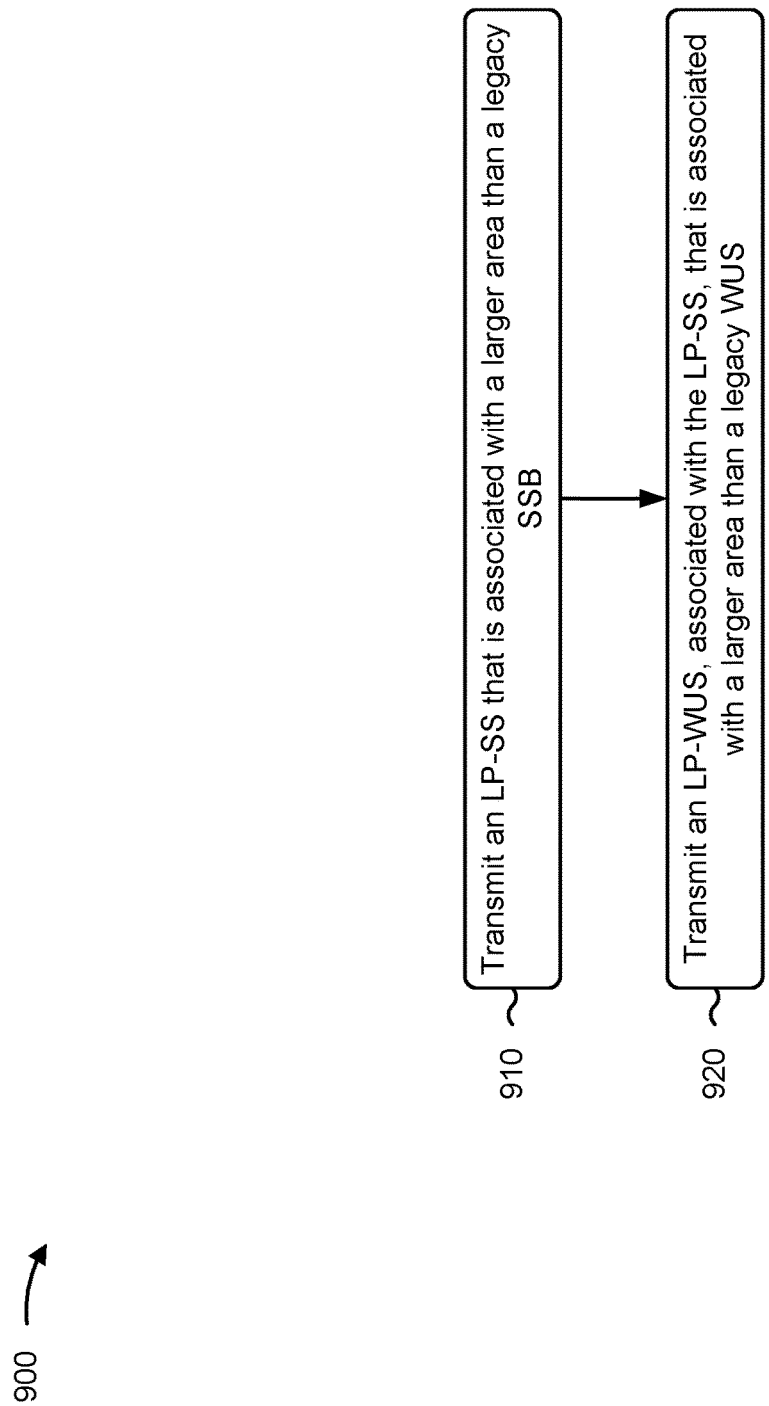

FIG. 9 is a diagram illustrating an example process 900 performed, for example, by a network entity, in accordance with the present disclosure. Example process 900 is an example where the network entity (e.g., network node 110 and/or apparatus 1100 of FIG. 11) performs operations associated with transmitting LP-SSs and LP-WUSs.

As shown in FIG. 9, in some aspects, process 900 may include transmitting an LP-SS that is associated with a first coverage area that is larger than a second coverage area associated with a legacy SSB (block 910). For example, the network entity (e.g., using communication manager 150 and/or transmission component 1104, depicted in FIG. 11) may transmit an LP-SS that is associated with a first coverage area that is larger than a second coverage area associated with a legacy SSB, as described herein.

As further shown in FIG. 9, in some aspects, process 900 may include transmitting an LP-WUS, associated with the LP-SS, that is associated with a third coverage area that is larger than a fourth coverage area associated with a legacy WUS (block 920). For example, the network entity (e.g., using communication manager 150 and/or transmission component 1104) may transmit an LP-WUS, associated with the LP-SS, that is associated with a third coverage area that is larger than a fourth coverage area associated with a legacy WUS, as described herein.

Process 900 may include additional aspects, such as any single aspect or any combination of aspects described below and/or in connection with one or more other processes described elsewhere herein.

In a first aspect, the LP-SS and the LP-WUS are associated with a first band that is lower than a second band associated with the legacy SSB and the legacy WUS.

In a second aspect, alone or in combination with the first aspect, the LP-SS and the LP-WUS are associated with an SFN with a multi-cell joint scheduling mode, and the legacy SSB and the legacy WUS are associated with a single-cell scheduling mode.

In a third aspect, alone or in combination with one or more of the first and second aspects, the LP-SS and the LP-WUS are associated with a first quantity of transmission beams that is smaller than a second quantity of transmission beams associated with the legacy SSB and the legacy WUS.

In a fourth aspect, alone or in combination with one or more of the first through third aspects, process 900 includes transmitting (e.g., using communication manager 150 and/or transmission component 1104) a paging message associated with the LP-WUS.

Figure 11:
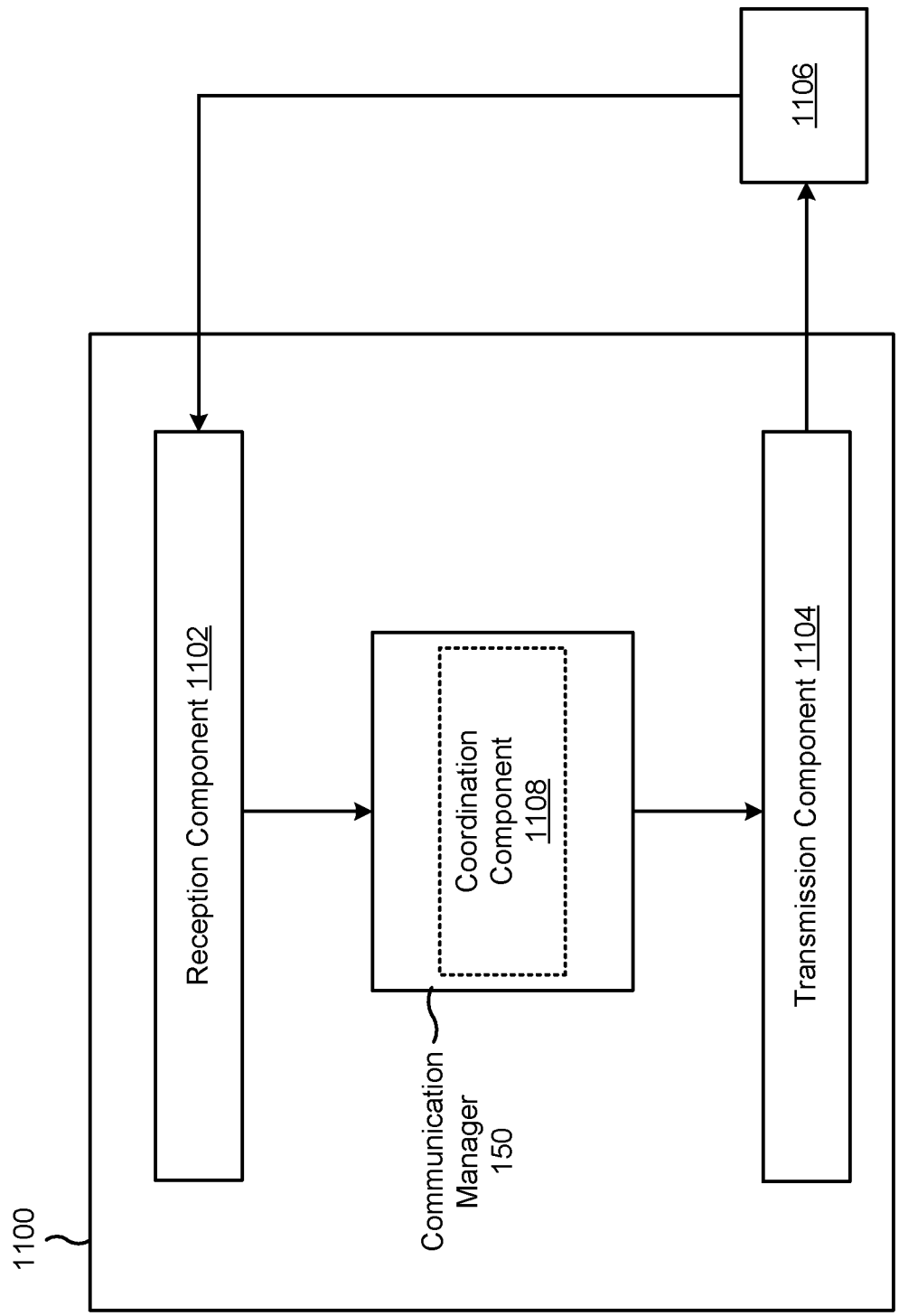

In a fifth aspect, alone or in combination with one or more of the first through fourth aspects, process 900 includes transmitting (e.g., using communication manager 150 and/or transmission component 1104) the legacy SSB after the LP-WUS, and receiving (e.g., using communication manager 150 and/or reception component 1102, depicted in FIG. 11) a report based at least in part on a measurement of the legacy SSB.

In a sixth aspect, alone or in combination with one or more of the first through fifth aspects, an end of a monitoring occasion associated with the LP-WUS is separated in time, by a gap, from a start of a transmission of the legacy SSB.

In a seventh aspect, alone or in combination with one or more of the first through sixth aspects, the gap is based at least in part on a first band associated with the LP-WUS, a second band associated with the legacy SSB, a first SCS associated with the LP-WUS, and a second SCS associated with the legacy SSB.

In an eighth aspect, alone or in combination with one or more of the first through seventh aspects, process 900 includes transmitting (e.g., using communication manager 150 and/or transmission component 1104) an indication of the gap.

In a ninth aspect, alone or in combination with one or more of the first through eighth aspects, process 900 includes receiving (e.g., using communication manager 150 and/or reception component 1102) an indication of a recommended gap, such that the gap is based at least in part on the recommended gap.

In a tenth aspect, alone or in combination with one or more of the first through ninth aspects, process 900 includes transmitting (e.g., using communication manager 150 and/or transmission component 1104) an indication that the LP-SS is transmitted.

In an eleventh aspect, alone or in combination with one or more of the first through tenth aspects, process 900 includes transmitting (e.g., using communication manager 150 and/or transmission component 1104) a list of neighbor areas that the LP-SS will be transmitted in.

In a twelfth aspect, alone or in combination with one or more of the first through eleventh aspects, process 900 includes receiving (e.g., using communication manager 150 and/or reception component 1102) a capability message indicating that a UE is configured to receive the LP-SS, such that the indication that the LP-SS is transmitted is based at least in part on the capability message.

In a thirteenth aspect, alone or in combination with one or more of the first through twelfth aspects, the LP-SS and the LP-WUS are associated with a same band as the legacy SSB and the legacy WUS.

In a fourteenth aspect, alone or in combination with one or more of the first through thirteenth aspects, the LP-SS and the LP-WUS are multiplexed with the legacy SSB and the legacy WUS.

In a fifteenth aspect, alone or in combination with one or more of the first through fourteenth aspects, the LP-SS is associated with a first periodicity that is longer than a second periodicity associated with the legacy SSB.

In a sixteenth aspect, alone or in combination with one or more of the first through fifteenth aspects, the LP-WUS is QCL'd with the LP-SS.

In a seventeenth aspect, alone or in combination with one or more of the first through sixteenth aspects, the LP-SS and the LP-WUS are associated with a first SCS that is smaller than a second SCS associated with the legacy SSB and the legacy WUS.

In an eighteenth aspect, alone or in combination with one or more of the first through seventeenth aspects, the LP-SS and the LP-WUS are associated with a first CP that is longer than a second CP associated with the legacy SSB and the legacy WUS.

In a nineteenth aspect, alone or in combination with one or more of the first through eighteenth aspects, the LP-SS and the LP-WUS are associated with a virtual cell ID, and the virtual cell ID is associated with a plurality of cells.

In a twentieth aspect, alone or in combination with one or more of the first through nineteenth aspects, process 900 includes transmitting (e.g., using communication manager 150 and/or transmission component 1104) an indication of the virtual cell ID.

In a twenty-first aspect, alone or in combination with one or more of the first through twentieth aspects, process 900 includes transmitting (e.g., using communication manager 150 and/or transmission component 1104) a configuration associated with the LP-SS.

In a twenty-second aspect, alone or in combination with one or more of the first through twenty-first aspects, process 900 includes transmitting (e.g., using communication manager 150 and/or transmission component 1104) a configuration associated with the LP-WUS.

In a twenty-third aspect, alone or in combination with one or more of the first through twenty-second aspects, process 900 includes transmitting (e.g., using communication manager 150 and/or transmission component 1104) a timer value associated with activation of a main receiver.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, an RU, or another wireless communication device) using the reception component 1002 and the transmission component 1004. As further shown, the apparatus 1000 may include the communication manager 140. The communication manager 140 may include one or more of a detection component 1008, a monitoring component 1010, an activation component 1012, a cell selection component 1014, and/or a determination component 1016, among other examples.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

In some aspects, the detection component 1008 may detect (e.g., using a low-power receiver of the apparatus 1000) an LP-SS that is associated with a first coverage area that is larger than a second coverage area associated with a legacy SSB. The detection component 1008 may include one or more antennas, a modem, a demodulator, a MIMO detector, a receive processor, a controller/processor, a memory, or a combination thereof, of the UE described in connection with FIG. 2. The monitoring component 1010 may monitor (e.g., using the low-power receiver of the apparatus 1000) for an LP-WUS, based at least in part on the LP-SS, that is associated with a third coverage area that is larger than a fourth coverage area associated with a legacy WUS. The monitoring component 1010 may include one or more antennas, a modem, a demodulator, a MIMO detector, a receive processor, a controller/processor, a memory, or a combination thereof, of the UE described in connection with FIG. 2.

In some aspects, the detection component 1008 may detect the LP-WUS. Accordingly, the activation component 1012 may activate a main receiver of the apparatus 1000 based at least in part on the detection component 1008 detecting the LP-WUS. The activation component 1012 may include one or more antennas, a modem, a demodulator, a MIMO detector, a receive processor, a controller/processor, a memory, or a combination thereof, of the UE described in connection with FIG. 2. In some aspects, the cell selection component 1014 may refrain from performing cell selection based at least in part on the detection component 1008 detecting the LP-SS. The cell selection component 1014 may include one or more antennas, a modem, a demodulator, a MIMO detector, a receive processor, a modulator, a transmit MIMO processor, a transmit processor, a controller/processor, a memory, or a combination thereof, of the UE described in connection with FIG. 2.

In some aspects, the determination component 1016 may determine that a distance between the apparatus 1000 and an edge of the first coverage area associated with the LP-SS satisfies a distance threshold. Accordingly, the activation component 1012 may activate a main receiver based at least in part on the determination component 1016 determining that the distance satisfies the distance threshold.

In some aspects, the determination component 1016 may determine that a received power of the LP-SS in a current area or a neighbor area fails to satisfy a received power threshold. Accordingly, the activation component 1012 may activate a main receiver based at least in part on the determination component 1016 determining that the received power of the LP-SS fails to satisfy the received power threshold.

In some aspects, the detection component 1008 may fail to detect the LP-SS in a current area or a neighbor area. Accordingly, the activation component 1012 may activate a main receiver based at least in part on the detection component 1008 failing to detect the LP-SS.

In some aspects, the reception component 1002 may receive (e.g., from a network node, such as the apparatus 1006) an indication of a gap between an end of a monitoring occasion associated with the LP-WUS and activation of the main receiver of the apparatus 1000 to monitor the legacy SSB. Additionally, in some aspects, the transmission component 1004 may transmit (e.g., to the apparatus 1006) an indication of a recommended gap, such that the reception component 1002 receives the indication of the gap in response to the indication of the recommended gap.

In some aspects, the reception component 1002 may receive (e.g., from a network node, such as the apparatus 1006) an indication that the LP-SS will be transmitted. Additionally, in some aspects, the reception component 1002 may receive (e.g., from the apparatus 1006) a list of neighbor areas that the LP-SS will be transmitted in. In some aspects, the transmission component 1004 may transmit (e.g., to the apparatus 1006) a capability message indicating that the apparatus 1000 is configured to receive the LP-SS, such that the reception component 1002 receives the indication that the LP-SS will be transmitted in response to the capability message.

In some aspects, the reception component 1002 may receive (e.g., from a network node, such as the apparatus 1006) an indication of the virtual cell ID. Additionally, or alternatively, the reception component 1002 may receive (e.g., from the apparatus 1006) a configuration associated with the LP-SS. Additionally, or alternatively, the reception component 1002 may receive (e.g., from the apparatus 1006) a configuration associated with the LP-WUS. Additionally, or alternatively, reception component 1002 may receive (e.g., from the apparatus 1006) a timer value associated with activation of a main receiver of the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

FIG. 11 is a diagram of an example apparatus 1100 for wireless communication, in accordance with the present disclosure. The apparatus 1100 may be a network entity, or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, an RU, or another wireless communication device) using the reception component 1102 and the transmission component 1104. As further shown, the apparatus 1100 may include the communication manager 150. The communication manager 150 may include a coordination component 1108, among other examples.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

In some aspects, the transmission component 1104 may transmit (e.g., to a UE, such as the apparatus 1106) an LP-SS that is associated with a first coverage area that is larger than a second coverage area associated with a legacy SSB. For example, the LP-SS may be associated with an SFN with a multi-cell joint scheduling mode. Accordingly, the coordination component 1108 may exchange messages (e.g., with one or more additional network nodes) to coordinate transmission of the LP-SS (e.g., in time, frequency, and/or space). The coordination component 1108 may include a receive processor, a transmit MIMO processor, a transmit processor, a controller/processor, a memory, or a combination thereof, of the network node described in connection with FIG. 2.

Additionally, the transmission component 1104 may transmit an LP-WUS, associated with the LP-SS, that is associated with a third coverage area that is larger than a fourth coverage area associated with a legacy WUS. For example, the LP-WUS may be associated with an SFN with a multi-cell joint scheduling mode. Accordingly, the coordination component 1108 may exchange messages (e.g., with one or more additional network nodes) to coordinate transmission of the LP-WUS (e.g., in time, frequency, and/or space).

Further, in some aspects, the transmission component 1104 may transmit a paging message associated with the LP-WUS. Additionally, or alternatively, the transmission component 1104 may transmit the legacy SSB after the LP-WUS. Accordingly, the reception component 1102 may receive a report based at least in part on a measurement of the legacy SSB.

In some aspects, the transmission component 1104 may transmit an indication of a gap between an end of a monitoring occasion associated with the LP-WUS and a start of a transmission of the legacy SSB. Additionally, in some aspects, the reception component 1102 may receive (e.g., from a UE, such as the apparatus 1106) an indication of a recommended gap, such that the gap is based at least in part on the recommended gap.

In some aspects, the transmission component 1104 may transmit an indication that the LP-SS is transmitted. Additionally, in some aspects, the transmission component 1104 may transmit a list of neighbor areas that the LP-SS will be transmitted in. In some aspects, the reception component 1102 may receive a capability message indicating that a UE is configured to receive the LP-SS, such that the transmission component 1104 transmits the indication that the LP-SS is transmitted based at least in part on the capability message.

In some aspects, the transmission component 1104 may transmit an indication of the virtual cell ID. Additionally, or alternatively, the transmission component 1104 may transmit a configuration associated with the LP-SS. Additionally, or alternatively, the transmission component 1104 may transmit a configuration associated with the LP-WUS. Additionally, or alternatively, the transmission component 1104 may transmit a timer value associated with activation of a main receiver.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: detecting, using a low-power receiver of the UE, a low-power synchronization signal (LP-SS), wherein the LP-SS is associated with a first coverage area that is larger than a second coverage area associated with a legacy synchronization signal block (SSB); and monitoring, using the low-power receiver, for a low-power wake up signal (LP-WUS) based at least in part on the LP-SS, wherein the LP-WUS is associated with a third coverage area that is larger than a fourth coverage area associated with a legacy wake up signal (WUS).

Aspect 2: The method of Aspect 1, wherein the LP-SS and the LP-WUS are associated with a first band that is lower than a second band associated with the legacy SSB and the legacy WUS.

Aspect 3: The method of Aspect 1, wherein the LP-SS and the LP-WUS are associated with a same band as the legacy SSB and the legacy WUS.

Aspect 4: The method of any of Aspects 1 through 3, wherein the LP-SS and the LP-WUS are associated with a single-frequency network with a multi-cell joint scheduling mode, and the legacy SSB and the legacy WUS are associated with a single-cell scheduling mode.

Aspect 5: The method of any of Aspects 1 through 4, wherein the LP-SS and the LP-WUS are associated with a first quantity of transmission beams that is smaller than a second quantity of transmission beams associated with the legacy SSB and the legacy WUS.

Aspect 6: The method of any of Aspects 1 through 5, further comprising: detecting the LP-WUS; and activating a main receiver of the UE based at least in part on detecting the LP-WUS.

Aspect 7: The method of any of Aspects 1 through 6, further comprising: refraining from performing cell selection based at least in part on detecting the LP-SS.

Aspect 8: The method of any of Aspects 1 through 7, further comprising: determining that a distance between the UE and an edge of the first coverage area associated with the LP-SS satisfies a distance threshold; and activating a main receiver based at least in part on determining that the distance satisfies the distance threshold.

Aspect 9: The method of any of Aspects 1 through 8, further comprising: determining that a received power of the LP-SS in a current area or a neighbor area fails to satisfy a received power threshold; and activating a main receiver based at least in part on determining that the received power of the LP-SS fails to satisfy the received power threshold.

Aspect 10: The method of any of Aspects 1 through 9, further comprising: failing to detect the LP-SS in a current area or a neighbor area; and activating a main receiver based at least in part on failing to detect the LP-SS.

Aspect 11: The method of any of Aspects 1 through 10, wherein an end of a monitoring occasion associated with the LP-WUS is separated in time, by a gap, from activation of a main receiver of the UE to monitor the legacy SSB.

Aspect 12: The method of Aspect 11, wherein the gap is based at least in part on a first band associated with the LP-WUS, a second band associated with the legacy SSB, a first subcarrier spacing associated with the LP-WUS, and a second subcarrier spacing associated with the legacy SSB.

Aspect 13: The method of any of Aspects 11 through 12, further comprising: receiving, from a network node, an indication of the gap.

Aspect 14: The method of Aspect 13, further comprising: transmitting, to the network node, an indication of a recommended gap, wherein the indication of the gap is received in response to the indication of the recommended gap.

Aspect 15: The method of any of Aspects 1 through 14, further comprising: receiving, from a network node, an indication that the LP-SS will be transmitted.

Aspect 16: The method of Aspect 15, further comprising: receiving, from a network node, a list of neighbor areas that the LP-SS will be transmitted in.

Aspect 17: The method of any of Aspects 15 through 16, further comprising: transmitting, to the network node, a capability message indicating that the UE is configured to receive the LP-SS, wherein the indication that the LP-SS will be transmitted is received in response to the capability message.

Aspect 18: The method of any of Aspects 1 through 17, wherein the LP-SS and the LP-WUS are multiplexed with the legacy SSB and the legacy WUS.

Aspect 19: The method of any of Aspects 1 through 18, wherein the LP-SS is associated with a first periodicity that longer than a second periodicity associated with the legacy SSB.

Aspect 20: The method of any of Aspects 1 through 19, wherein the LP-WUS is quasi-co-located with the LP-SS.

Aspect 21: The method of any of Aspects 1 through 20, wherein the LP-SS and the LP-WUS are associated with a first subcarrier spacing that is smaller than a second subcarrier spacing associated with the legacy SSB and the legacy WUS.

Aspect 22: The method of any of Aspects 1 through 21, wherein the LP-SS and the LP-WUS are associated with a first cyclic prefix that is longer than a second cyclic prefix associated with the legacy SSB and the legacy WUS.

Aspect 23: The method of any of Aspects 1 through 22, wherein the LP-SS and the LP-WUS are associated with a virtual cell identity (ID), and the virtual cell ID is associated with a plurality of cells.

Aspect 24: The method of Aspect 23, further comprising: receiving, from a network node, an indication of the virtual cell ID.

Aspect 25: The method of any of Aspects 1 through 24, further comprising: receiving, from a network node, a configuration associated with the LP-SS.

Aspect 26: The method of any of Aspects 1 through 25, further comprising: receiving, from a network node, a configuration associated with the LP-WUS.

Aspect 27: The method of any of Aspects 1 through 26, further comprising: receiving, from a network node, a timer value associated with activation of a main receiver of the UE.

Aspect 28: A method of wireless communication performed by a network entity, comprising: transmitting a low-power synchronization signal (LP-SS), wherein the LP-SS is associated with a first coverage area that is larger than a second coverage area associated with a legacy synchronization signal block (SSB); and transmitting a low-power wake up signal (LP-WUS) associated with the LP-SS, wherein the LP-WUS is associated with a third coverage area that is larger than a fourth coverage area associated with a legacy wake up signal (WUS).

Aspect 29: The method of Aspect 28, wherein the LP-SS and the LP-WUS are associated with a first band that is lower than a second band associated with the legacy SSB and the legacy WUS.

Aspect 30: The method of Aspect 28, wherein the LP-SS and the LP-WUS are associated with a same band as the legacy SSB and the legacy WUS.

Aspect 31: The method of any of Aspects 28 through 30, wherein the LP-SS and the LP-WUS are associated with a single-frequency network with a multi-cell joint scheduling mode, and the legacy SSB and the legacy WUS are associated with a single-cell scheduling mode.

Aspect 32: The method of any of Aspects 28 through 31, wherein the LP-SS and the LP-WUS are associated with a first quantity of transmission beams that is smaller than a second quantity of transmission beams associated with the legacy SSB and the legacy WUS.

Aspect 33: The method of any of Aspects 28 through 32, further comprising: transmitting a paging message associated with the LP-WUS.

Aspect 34: The method of any of Aspects 28 through 33, further comprising: transmitting the legacy SSB after the LP-WUS; and receiving a report based at least in part on a measurement of the legacy SSB.

Aspect 35: The method of any of Aspects 28 through 34, wherein an end of a monitoring occasion associated with the LP-WUS is separated in time, by a gap, from a start of a transmission of the legacy SSB.

Aspect 36: The method of Aspect 35, wherein the gap is based at least in part on a first band associated with the LP-WUS, a second band associated with the legacy SSB, a first subcarrier spacing associated with the LP-WUS, and a second subcarrier spacing associated with the legacy SSB.

Aspect 37: The method of any of Aspects 35 through 36, further comprising: transmitting an indication of the gap.

Aspect 38: The method of Aspect 37, further comprising: receiving an indication of a recommended gap, wherein the gap is based at least in part on the recommended gap.

Aspect 39: The method of any of Aspects 28 through 38, further comprising: transmitting an indication that the LP-SS is transmitted.

Aspect 40: The method of Aspect 39, further comprising: transmitting a list of neighbor areas that the LP-SS will be transmitted in.

Aspect 41: The method of any of Aspects 39 through 40, further comprising: receiving a capability message indicating that a user equipment (UE) is configured to receive the LP-SS, wherein the indication that the LP-SS is transmitted is based at least in part on the capability message.

Aspect 42: The method of any of Aspects 28 through 41, wherein the LP-SS and the LP-WUS are multiplexed with the legacy SSB and the legacy WUS.

Aspect 43: The method of any of Aspects 28 through 42, wherein the LP-SS is associated with a first periodicity that is longer than a second periodicity associated with the legacy SSB.

Aspect 44: The method of any of Aspects 28 through 43, wherein the LP-WUS is quasi-co-located with the LP-SS.

Aspect 45: The method of any of Aspects 28 through 44, wherein the LP-SS and the LP-WUS are associated with a first subcarrier spacing that is smaller than a second subcarrier spacing associated with the legacy SSB and the legacy WUS.

Aspect 46: The method of any of Aspects 28 through 45, wherein the LP-SS and the LP-WUS are associated with a first cyclic prefix that is longer than a second cyclic prefix associated with the legacy SSB and the legacy WUS.

Aspect 47: The method of any of Aspects 28 through 46, wherein the LP-SS and the LP-WUS are associated with a virtual cell identity (ID), and the virtual cell ID is associated with a plurality of cells.

Aspect 48: The method of Aspect 47, further comprising: transmitting an indication of the virtual cell ID.

Aspect 49: The method of any of Aspects 28 through 48, further comprising: transmitting a configuration associated with the LP-SS.

Aspect 50: The method of any of Aspects 28 through 49, further comprising: transmitting a configuration associated with the LP-WUS.

Aspect 51: The method of any of Aspects 28 through 50, further comprising: transmitting a timer value associated with activation of a main receiver.

Aspect 52: An apparatus for wireless communication at a device, comprising a processor; memory coupled with the processor; and instructions stored in the memory and executable by the processor to cause the apparatus to perform the method of one or more of Aspects 1-27.

Aspect 53: A device for wireless communication, comprising a memory and one or more processors coupled to the memory, the one or more processors configured to perform the method of one or more of Aspects 1-27.

Aspect 54: An apparatus for wireless communication, comprising at least one means for performing the method of one or more of Aspects 1-27.

Aspect 55: A non-transitory computer-readable medium storing code for wireless communication, the code comprising instructions executable by a processor to perform the method of one or more of Aspects 1-27.

Aspect 56: A non-transitory computer-readable medium storing a set of instructions for wireless communication, the set of instructions comprising one or more instructions that, when executed by one or more processors of a device, cause the device to perform the method of one or more of Aspects 1-27.

Aspect 57: An apparatus for wireless communication at a device, comprising a processor; memory coupled with the processor; and instructions stored in the memory and executable by the processor to cause the apparatus to perform the method of one or more of Aspects 28-51.

Aspect 58: A device for wireless communication, comprising a memory and one or more processors coupled to the memory, the one or more processors configured to perform the method of one or more of Aspects 28-51.

Aspect 59: An apparatus for wireless communication, comprising at least one means for performing the method of one or more of Aspects 28-51.

Aspect 60: A non-transitory computer-readable medium storing code for wireless communication, the code comprising instructions executable by a processor to perform the method of one or more of Aspects 28-51.

Aspect 61: A non-transitory computer-readable medium storing a set of instructions for wireless communication, the set of instructions comprising one or more instructions that, when executed by one or more processors of a device, cause the device to perform the method of one or more of Aspects 28-51.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      detect, using a low-power receiver of the UE, a low-power synchronization signal (LP-SS), wherein the LP-SS is associated with a first coverage area that is larger than a second coverage area associated with a legacy synchronization signal block (SSB); and
      monitor, using the low-power receiver, for a low-power wake up signal (LP-WUS) based at least in part on the LP-SS, wherein the LP-WUS is associated with a third coverage area that is larger than a fourth coverage area associated with a legacy wake up signal (WUS).

2. The apparatus of claim 1, wherein the LP-SS and the LP-WUS are associated with a first band that is lower than a second band associated with the legacy SSB and the legacy WUS.

3. The apparatus of claim 1, wherein the LP-SS and the LP-WUS are associated with a single-frequency network with a multi-cell joint scheduling mode, and the legacy SSB and the legacy WUS are associated with a single-cell scheduling mode.

4. The apparatus of claim 1, wherein the LP-SS and the LP-WUS are associated with a first quantity of transmission beams that is smaller than a second quantity of transmission beams associated with the legacy SSB and the legacy WUS.

5. The apparatus of claim 1, wherein the one or more processors are further configured to:
   detect the LP-WUS; and
   activate a main receiver of the UE based at least in part on detecting the LP-WUS.

6. The apparatus of claim 1, wherein the one or more processors are further configured to:
   refrain from performing cell selection based at least in part on detecting the LP-SS.

7. The apparatus of claim 1, wherein the one or more processors are further configured to:
   determine that a distance between the UE and an edge of the first coverage area associated with the LP-SS satisfies a distance threshold; and
   activate a main receiver based at least in part on determining that the distance satisfies the distance threshold.

8. The apparatus of claim 1, wherein the one or more processors are further configured to:
   determine that a received power of the LP-SS in a current area or a neighbor area fails to satisfy a received power threshold; and
   activate a main receiver based at least in part on determining that the received power of the LP-SS fails to satisfy the received power threshold.

9. The apparatus of claim 1, wherein the one or more processors are further configured to:
   fail to detect the LP-SS in a current area or a neighbor area; and
   activate a main receiver based at least in part on failing to detect the LP-SS.

10. The apparatus of claim 1, wherein an end of a monitoring occasion associated with the LP-WUS is separated in time, by a gap, from activation of a main receiver of the UE to monitor the legacy SSB.

11. The apparatus of claim 10, wherein the gap is based at least in part on a first band associated with the LP-WUS, a second band associated with the legacy SSB, a first subcarrier spacing associated with the LP-WUS, and a second subcarrier spacing associated with the legacy SSB.

12. The apparatus of claim 10, wherein the one or more processors are further configured to:
receive, from a network node, an indication of the gap.

13. The apparatus of claim 12, wherein the one or more processors are further configured to:
transmit, to the network node, an indication of a recommended gap,
wherein the indication of the gap is received in response to the indication of the recommended gap.

14. The apparatus of claim 1, wherein the one or more processors are further configured to:
receive, from a network node, an indication that the LP-SS will be transmitted.

15. The apparatus of claim 14, wherein the one or more processors are further configured to:
receive, from the network node, a list of neighbor areas that the LP-SS will be transmitted in.

16. The apparatus of claim 14, wherein the one or more processors are further reconfigured to:
transmit, to the network node, a capability message indicating that the UE is configured to receive the LP-SS,
wherein the indication that the LP-SS will be transmitted is received in response to the capability message.

17. The apparatus of claim 1, wherein the LP-SS and LP-WUS are associated with a same band as the legacy SSB and the legacy WUS.

18. The apparatus of claim 1, wherein the LP-SS and LP-WUS are multiplexed with the legacy SSB and the legacy WUS.

19. The apparatus of claim 1, wherein the LP-SS is associated with a first periodicity that longer than a second periodicity associated with the legacy SSB.

20. The apparatus of claim 1, wherein the LP-WUS is quasi-co-located with the LP-SS.

21. The apparatus of claim 1, wherein the LP-SS and the LP-WUS are associated with a first subcarrier spacing that is smaller than a second subcarrier spacing associated with the legacy SSB and the legacy WUS.

22. The apparatus of claim 1, wherein the LP-SS and the LP-WUS are associated with a first cyclic prefix that is longer than a second cyclic prefix associated with the legacy SSB and the legacy WUS.

23. The apparatus of claim 1, wherein the LP-SS and the LP-WUS are associated with a virtual cell identity (ID), and the virtual cell ID is associated with a plurality of cells.

24. The apparatus of claim 23, wherein the one or more processors are further configured to:
receive, from a network node, an indication of the virtual cell ID.

25. The apparatus of claim 1, wherein the one or more processors are further configured to:
receive, from a network node, a configuration associated with the LP-SS.

26. The apparatus of claim 1, wherein the one or more processors are further configured to:
receive, from a network node, a configuration associated with the LP-WUS.

27. The apparatus of claim 1, wherein the one or more processors are further configured to:
receive, from a network node, a timer value associated with activation of a main receiver of the UE.

28. An apparatus for wireless communication at a network entity, comprising:
a memory; and
one or more processors, coupled to the memory, configured to:
transmit a low-power synchronization signal (LP-SS), wherein the LP-SS is associated with a first coverage area that is larger than a second coverage area associated with a legacy synchronization signal block (SSB); and
transmit a low-power wake up signal (LP-WUS) associated with the LP-SS, wherein the LP-WUS is associated with a third coverage area that is larger than a fourth coverage area associated with a legacy wake up signal (WUS).

29. A method of wireless communication performed by a user equipment (UE), comprising:
detecting, using a low-power receiver of the UE, a low-power synchronization signal (LP-SS), wherein the LP-SS is associated with a first coverage area that is larger than a second coverage area associated with a legacy synchronization signal block (SSB); and
monitoring, using the low-power receiver, for a low-power wake up signal (LP-WUS) based at least in part on the LP-SS, wherein the LP-WUS is associated with a third coverage area that is larger than a fourth coverage area associated with a legacy wake up signal (WUS).

30. A method of wireless communication performed by a network entity, comprising:
transmitting a low-power synchronization signal (LP-SS), wherein the LP-SS is associated with a first coverage area that is larger than a second coverage area associated with a legacy synchronization signal block (SSB); and
transmitting a low-power wake up signal (LP-WUS) associated with the LP-SS, wherein the LP-WUS is associated with a third coverage area that is larger than a fourth coverage area associated with a legacy wake up signal (WUS).

* * * * *